United States Patent
Mccollum et al.

(10) Patent No.: US 12,475,007 B2
(45) Date of Patent: Nov. 18, 2025

(54) METHODS AND SYSTEMS FOR ENHANCED FAULT DETECTION OF A COMPONENT OF A COMPUTING NODE THROUGH PEER-BASED ASSESSMENTS

(71) Applicant: Penguin Computing, Inc., Fremont, CA (US)

(72) Inventors: Nicholas Mccollum, Decatur, AL (US); Kevin Manalo, Saint Johns, FL (US)

(73) Assignee: Penguin Solutions, Inc., Fremont, CA (US)

( * ) Notice: Subject to any disclaimer, the term of this patent is extended or adjusted under 35 U.S.C. 154(b) by 7 days.

(21) Appl. No.: 18/604,425

(22) Filed: Mar. 13, 2024

(65) Prior Publication Data
US 2025/0291686 A1    Sep. 18, 2025

(51) Int. Cl.
*G06F 11/20* (2006.01)
*G06F 11/34* (2006.01)

(52) U.S. Cl.
CPC ...... *G06F 11/2079* (2013.01); *G06F 11/3428* (2013.01)

(58) Field of Classification Search
CPC .......................... G06F 11/2079; G06F 11/3428
See application file for complete search history.

(56) References Cited

U.S. PATENT DOCUMENTS

| | | |
|---|---|---|
| 2004/0003078 A1 | 1/2004 | Todd et al. |
| 2014/0269342 A1 | 9/2014 | Baron |
| 2017/0249234 A1 | 8/2017 | Kalech et al. |
| 2018/0370029 A1* | 12/2018 | Hall ..................... G06F 11/0715 |
| 2023/0362178 A1* | 11/2023 | Pandey ................. H04L 41/064 |
| 2024/0412620 A1* | 12/2024 | Andrzejewski ...... G08B 26/008 |

OTHER PUBLICATIONS

International Search Report and Written Opinion received in International Application No. PCT/US2025/018346, mailed May 6, 2025, pp. 1-8.

* cited by examiner

*Primary Examiner* — Bryce P Bonzo
*Assistant Examiner* — Sean Kevin McNamara
(74) *Attorney, Agent, or Firm* — Padowithz Alce; Alce PLLC

(57) ABSTRACT

A system and method for enhanced fault detection of a component includes executing a component health assessment of a plurality of components of a computing node based on identifying the computing node as having an unhealthy state of health, wherein executing the component health assessment of the plurality of components includes: identifying a healthy computing node having a healthy state of health; establishing a plurality of distinct pairs of components, each distinct pair of components of the plurality of distinct pairs of components includes one component of the computing node and one component of the healthy computing node; and executing bi-directional testing by each of the plurality of distinct pairs of components; evaluating health assessment data generated based on the execution of the bi-directional testing; and classifying as faulty components of the plurality of components of the computing node based on the evaluation of the health assessment data.

19 Claims, 13 Drawing Sheets

200

Configuring Node Health Assessment Parameters S210

Configuring a Node Health Assessment S220

Executing a Node Health Assessment of a Quora of Computing Nodes S230

Identifying Healthy or Unhealthy Computing Nodes S240

Handling Non-Performant or Unhealthy Computing Nodes S250

```
┌─────────────────────────────────────────────────────────────────┐
│  Identifying a Target Computing Node for Component Error Testing S310  │
└─────────────────────────────────────────────────────────────────┘

┌─────────────────────────────────────────────────────────────────┐
│       Configuring a Node Component Health Assessment S320        │
└─────────────────────────────────────────────────────────────────┘

┌─────────────────────────────────────────────────────────────────┐
│        Executing a Node Component Health Assessment S330         │
└─────────────────────────────────────────────────────────────────┘

┌─────────────────────────────────────────────────────────────────┐
│  Identifying a State of Health of one or more Components of a Target │
│                     Computing Node S340                          │
└─────────────────────────────────────────────────────────────────┘

┌─────────────────────────────────────────────────────────────────┐
│             Remediating a Faulty Node Component S350             │
└─────────────────────────────────────────────────────────────────┘

┌─────────────────────────────────────────────────────────────────┐
│              Qualifying a Target Computing Node S355             │
└─────────────────────────────────────────────────────────────────┘
```

FIGURE 8

| Target Computing Node |||||
|---|---|---|---|
| Component-Type A (e.g., Processing Compoent or Networking Component) | Component-Type B (e.g., Processing Compoent or Networking Component) | Component-Type C (e.g., Processing Compoent or Networking Component) | Component-Type D (e.g., Processing Compoent or Networking Component) |
| Component-Type E (e.g., Processing Compoent or Networking Component) | Component-Type F (e.g., Processing Compoent or Networking Component) | Component-Type G (e.g., Processing Compoent or Networking Component) | Component-Type H (e.g., Processing Compoent or Networking Component) |

| Golden Computing Node |||||
|---|---|---|---|
| Component-Type I (e.g., Processing Compoent or Networking Component) | Component-Type J (e.g., Processing Compoent or Networking Component) | Component-Type K (e.g., Processing Compoent or Networking Component) | Component-Type L (e.g., Processing Compoent or Networking Component) |
| Component-Type M (e.g., Processing Compoent or Networking Component) | Component-Type N (e.g., Processing Compoent or Networking Component) | Component-Type O (e.g., Processing Compoent or Networking Component) | Component-Type P (e.g., Processing Compoent or Networking Component) |

FIGURE 9

METHODS AND SYSTEMS FOR ENHANCED FAULT DETECTION OF A COMPONENT OF A COMPUTING NODE THROUGH PEER-BASED ASSESSMENTS

TECHNICAL FIELD

This invention relates generally to the computer cluster management field, and more specifically to new and useful systems and methods for conducting health checks of and detecting unhealthy computing nodes and components of computing nodes in the computer cluster management field.

BACKGROUND

Traditional methods for ensuring the integrity and performance of a cluster of computers often rely heavily on self-reporting mechanisms from the hardware components or computers within the cluster. These methods await error signals such as logs, messages, or other indications from the hardware to identify issues. However, this approach is insufficient as it fails to detect problems that do not self-report, leading to undiagnosed issues that degrade cluster performance.

Some systems may employ single-point health checks provided by server hardware vendors, which monitor the status of a single computing node and its components. These systems are limited as they depend on the hardware's ability to recognize and communicate its own failures. Such reliance on self-reporting not only overlooks silent failures but also neglects the health of the network interconnected components. Given that modern GPU servers and similar servers are increasingly connected via high-speed fiber-optic networks, direct attach copper, and/or the like, this oversight can result in unacknowledged bottlenecks and faults within the cluster's communication infrastructure.

The technology introduced herein addresses the aforementioned limitations by providing a robust health check framework that actively tests nodes bi-directionally against their peers within the cluster. At least this innovative approach ensures the reliable detection of faulty computing nodes within a cluster without depending on vendor-specific, single-server health checks. By facilitating indirect testing of the network interconnects, the invention comprehensively evaluates the health of the entire cluster of computers, including various network components of the cluster of computers. Consequently, the inventions described herein offer improved systems and methods for maintaining optimal cluster performance and reliability.

SUMMARY OF THE INVENTION(S)

In one or more embodiments, a method for enhanced fault detection of a component of a computing node includes executing a component health assessment of a plurality of components of a target computing node based on identifying the target computing node as having an unhealthy state of health, wherein executing the component health assessment of the plurality of components includes: identifying a healthy computing node having a healthy state of health; establishing a plurality of distinct pairs of components, each distinct pair of components of the plurality of distinct pairs of components includes one component of the target computing node and one component of the healthy computing node; and executing bi-directional testing by each of the plurality of distinct pairs of components; evaluating health assessment data generated based on the execution of the bi-directional testing; and classifying as faulty one or more components of the plurality of components of the target computing node based on the evaluation of the health assessment data.

In one or more embodiments, the evaluating the health assessment data includes: identifying a subset of pairs of components of the plurality of distinct pairs of components that fail to satisfy one or more performance benchmarks; and identifying within the subset of pairs of components, the one or more components of the target computing node appearing in more than one pair of components of the subset of pairs of components.

In one or more embodiments, the classification of faulty is based at least on the one or more components of the target computing node appearing in the more than one pair of components of the subset of pairs of components.

In one or more embodiments, the evaluating the health assessment data includes: comparing a performance metric of each pair of components of the plurality of distinct pairs of components to a performance benchmark; and identifying any component of the target computing node that fails to satisfy the performance benchmark across multiple pairs of components of the plurality of distinct pairs of components.

In one or more embodiments, the classification of faulty is based at least on identifying the one or more components of the target computing node in the multiple pairs of components of the plurality of distinct pairs of components.

In one or more embodiments, establishing the plurality of distinct pairs of components includes computing a Cartesian product between a set of components of the target computing node and a set of components of the healthy computing node.

In one or more embodiments, the plurality of components of the target computing node includes a plurality of distinct component types including a plurality of processing components and a plurality of networking components.

In one or more embodiments, the method further includes configuring the component health assessment based on identifying a suspected faulty component type of the plurality of distinct component types of the target computing node, wherein configuring the health assessment includes selecting one or more node component health tests according to a component type of the suspected faulty component type.

In one or more embodiments, the executing the bi-directional testing includes: concurrently executing the bi-directional testing by at least a subset of pairs of components of the plurality of distinct pairs of components, each pair of the subset of pairs including a unique combination of components that does share a component that is common with any other pair of the subset of pairs.

In one or more embodiments, the method further includes identifying from a repair matrix one or more remedial actions for repairing the target computing node based on the classification of faulty of the one or more components, wherein: the repair matrix includes a data structure that maps each of a plurality of distinct faults to one or more remedial actions, and identifying the one or more remedial actions includes performing a search of the repair matrix using data associated with the classification of faulty.

In one or more embodiments, the method further includes generating an assessment composition based on the health assessment data, wherein the assessment composition includes a graphical illustration listing the plurality of distinct pairs of components with an identification within the listing of the one or more components of the plurality of components that fail to satisfy one or more tests of the node component health assessment.

In one or more embodiments, the healthy computing node is selected from a peer group of computing nodes associated with the target computing node; and the peer group of computing nodes includes a plurality of computing nodes having common hardware attributes as the target computing node.

In one or more embodiments, a system for enhanced fault detection of a component of a computing node includes a testing module configured to execute a component health assessment of a plurality of components of a target computing node based on identifying the target computing node as having an unhealthy state of health, wherein executing the component health assessment of the plurality of components includes: identifying a healthy computing node having a healthy state of health; establishing a plurality of distinct pairs of components, each distinct pair of components of the plurality of distinct pairs of components includes one component of the target computing node and one component of the healthy computing node; and executing bi-directional testing by each of the plurality of distinct pairs of components; a data analysis module configured to evaluate health assessment data generated based on the execution of the bi-directional testing; and a fault characterization module that classifies as faulty one or more components of the plurality of components of the target computing node based on the evaluation of the health assessment data.

In one or more embodiments, the evaluating the health assessment data includes: identifying a subset of pairs of components of the plurality of distinct pairs of components that fail to satisfy one or more performance benchmarks; and identifying within the subset of pairs of components, the one or more components of the target computing node appearing in more than one pair of components of the subset of pairs of components.

In one or more embodiments, the evaluating the health assessment data includes: comparing a performance metric of each pair of components of the plurality of distinct pairs of components to a performance benchmark; and identifying any component of the target computing node that fails to satisfy the performance benchmark across multiple pairs of components of the plurality of distinct pairs of components.

In one or more embodiments, the executing the bi-directional testing includes: concurrently executing the bi-directional testing by at least a subset of pairs of components of the plurality of distinct pairs of components, each pair of the subset of pairs including a unique combination of components that does share a component that is common with any other pair of the subset of pairs.

In one or more embodiments, a computer-program product comprising a non-transitory machine-readable storage medium storing computer instructions that, when executed by one or more processors, perform operations including executing a component health assessment of a plurality of components of a target computing node based on identifying the target computing node as having an unhealthy state of health, wherein executing the component health assessment of the plurality of components includes: identifying a healthy computing node having a healthy state of health; establishing a plurality of distinct pairs of components, each distinct pair of components of the plurality of distinct pairs of components includes one component of the target computing node and one component of the healthy computing node; and executing bi-directional testing by each of the plurality of distinct pairs of components; evaluating health assessment data generated based on the execution of the bi-directional testing; and classifying as faulty one or more components of the plurality of components of the target computing node based on the evaluation of the health assessment data.

In one or more embodiments, the evaluating the health assessment data includes: identifying a subset of pairs of components of the plurality of distinct pairs of components that fail to satisfy one or more performance benchmarks; and identifying within the subset of pairs of components, the one or more components of the target computing node appearing in more than one pair of components of the subset of pairs of components.

In one or more embodiments, the evaluating the health assessment data includes: comparing a performance metric of each pair of components of the plurality of distinct pairs of components to a performance benchmark; and identifying any component of the target computing node that fails to satisfy the performance benchmark across multiple pairs of components of the plurality of distinct pairs of components.

In one or more embodiments, the executing the bi-directional testing includes: concurrently executing the bi-directional testing by at least a subset of pairs of components of the plurality of distinct pairs of components, each pair of the subset of pairs including a unique combination of components that does share a component that is common with any other pair of the subset of pairs.

In one embodiment, a method for enhanced cluster health management and detection of unhealthy computing nodes, the method including implementing an assessment interface in operable command communication with an administrative computing node of a cluster of computing nodes, the administrative computing node being network to computing nodes of the cluster of computing nodes for implementing an assessment of health; identifying a quora of computing nodes of the cluster of computing nodes, the quora of computing nodes including a subset of computing nodes within the cluster of computing nodes having hardware components that are homogeneous; signaling, via the assessment interface, the administrative computing node to cause the quora of computing nodes to execute the assessment of health, wherein executing the assessment of health includes: defining, for each test cycle of a plurality of test cycles of the assessment of health, a plurality of distinct pairs of computing nodes from the quora of computing nodes, wherein each test cycle of the assessment of health assesses a different combination of paired computing nodes of the plurality of distinct pairs of computing nodes; implementing a bi-directional testing by each pair of computing nodes of the plurality of distinct pairs of computing nodes; evaluating bi-directional testing data obtained based on the execution of the assessment of health of the quora of computing nodes; classifying at least one computing node of the quora of computing nodes as unhealthy when the evaluation indicates that a subset of the bi-directional testing data associated with the at least one computing node fails to satisfy one or more benchmark node performance values; and altering the quora of computing nodes by removing the at least one computing node to mitigate a likely performance degradation of the cluster of computing nodes.

In one or more embodiments, the assessment of health includes a collection of computer-executable instructions stored along a parallel file system of the cluster of computing nodes, the computer-executable instructions of the assessment of health, when executed, automatically initializes the assessment of health and causes the execution of the assessment of health by the quora of computing nodes.

In one or more embodiments, initializing the assessment of health includes: assigning the quora of computing nodes to a node testing queue encoded for n−1 testing of the quora of computing nodes; and identifying the one or more node health test from a pool of node health tests based on attributes of the computing nodes within the quora of computing nodes.

In one or more embodiments, implementing the bi-directional testing causes each pair of computing nodes of the plurality of distinct pairs of computing nodes to establish a communication channel between computing nodes defining each respective pair of computing nodes, and execute one or more node health tests by transmitting data associated with the execution of the one or more node health test via the communication channel of each respective pair of computing nodes.

In one or more embodiments, the bi-directional testing data includes one or more of data processing rates of each pair of computing nodes and data transmission rates of each pair of computing nodes.

In one or more embodiments, the method further includes ordering the plurality of distinct pairs of computing nodes based on descending performance metrics; applying the one or more benchmark node performance values against the ordering of the plurality of distinct pairs of computing nodes, wherein classifying the at least one computing node of the quora of computing nodes as unhealthy is based on the application of the one or more benchmark node performance values against the ordering of the plurality of distinct pairs of computing nodes.

In one or more embodiments, the method includes verifying the classification of the at least one computing node as unhealthy, wherein the verification includes assessing the at least one computing node against a reference computing node having a classification of healthy.

In one or more embodiments, the health assessment includes a drop out and accumulation health assessment that per iteration of the node health assessment against the quora of computing nodes: drop outs a given computing node as identified as unhealthy from the quora of computing nodes by altering the quora of computing nodes to exclude the given computing node, and accumulates computing nodes not identified as unhealthy within the quora of computing nodes by maintaining member computing nodes of the quora of computing nodes to a subsequent iteration of the node health assessment.

In one embodiment, a computer-implemented method for detecting non-performant computing nodes within a cluster of computing nodes, the computer-implemented method includes initializing an assessment of health of a cluster of computing nodes based on one or more assessment instructions, wherein initializing the assessment of health includes: identifying a plurality of computing nodes within the cluster of computing nodes that are in an idle state; assigning at least a subset of computing nodes of the plurality of computing nodes in the idle state to a queue for testing a state of health of each of the subset of computing nodes; defining a plurality of pairings of computing nodes based on the subset of computing nodes, wherein each pairing of computing nodes of the plurality of pairings of computing nodes includes a distinct paired combination of computing nodes selected from the subset of computing nodes;

executing the assessment of health against the plurality of pairings of computing nodes, wherein the executing the assessment of health includes: implementing a bi-directional testing by each pairing of computing nodes of the plurality of pairing of computing nodes, wherein each pairing of computing nodes executes one or more node health tests based on testing communications between nodes defining each respective pairing of computing nodes of the plurality of pairings of computing nodes; obtaining assessment data based on the execution of the health assessment by the plurality of pairings of computing nodes, wherein the assessment data includes efficacy metrics for each pairing of computing nodes of the plurality of pairings of computing nodes, the efficacy metrics relating to a value of a data processing performance or a value of a data transmission performance of each pairing of computing nodes resulting from the execution of the one or more node health tests; identifying as likely unhealthy nodes one or more computing nodes failing to satisfy one or more health efficacy thresholds based on the assessment data; and altering a state of the one or more computing nodes identified as likely unhealthy nodes from an online state to an offline state thereby mitigating a likely degradation of the cluster of computing nodes.

In one or more embodiments, the one or more health efficacy thresholds relates to one or more minimum expected efficacy values for the value of the data processing performance or the value of the data transmission performance.

In one or more embodiments, implementing the bi-directional testing of the plurality of pairings of computing nodes includes establishing a testing channel between the nodes of each respective pairing of computing nodes of the plurality of pairings of computing nodes; and execute one or more node health tests by transmitting data associated with the execution of the one or more node health test via the test channel of each respective pairing of computing nodes of the plurality of pairings of computing nodes.

In one or more embodiments, altering the state of the one or more computing nodes identified as likely unhealthy further includes marking the one or more computing nodes for a fault verification process that identifies a distinct hardware component contributing to the identification of the one or more computing nodes as likely unhealthy.

In one or more embodiments, the method further includes routing the one or more computing nodes to a fault characterization process based on the identification of the one or more computing nodes as likely unhealthy; identifying by the fault characterization process one or more hardware components failing to satisfy one or more hardware performance standards; and characterizing a fault of the one or more computing nodes based on the identified one or more hardware components failing to satisfy the one or more hardware performance standards.

In one or more embodiments, the queue for testing the state of health of each of the subset of computing nodes is encoded for n−1 testing of the computing nodes in a plurality of testing cycles, and for each testing cycle of the plurality of testing cycles, a group of potentially unhealthy nodes is identified.

In one or more embodiments, the assessment of health further includes identifying the one or more computing nodes that are shared or common to two or more groups of potentially unhealthy nodes, wherein the identification of the one or more computing nodes as likely unhealthy nodes if further based on the one or more computing nodes being shared or common to the two or more groups of potentially unhealthy nodes.

In one or more embodiments, the cluster of computing nodes includes a plurality of diverse computing nodes having varying hardware components, the executing the assessment of health further includes identifying a homogeneous group of computing nodes of the cluster of computing nodes, the homogeneous group of computing nodes relating to computing nodes having a same processing component or a same network interconnect component, and identifying the plurality of computing nodes that are in the idle state are selected from within the homogeneous group of computing nodes of the cluster of computing nodes.

In one or more embodiments, the method includes generating benchmark data based on using the one or more health tests to evaluate a subset of computing nodes of the cluster of computing nodes before executing the node health assessment, wherein the benchmark data includes one or more expected values of performance for a given computing node identified as a healthy node.

In one embodiment, a computer-program product embodied in a non-transitory machine-readable storage medium storing computer instructions that, when executed by one or more processors, perform operations including implementing an assessment interface in operable command communication with an administrative computing node of a cluster of computing nodes, the administrative computing node being network to computing nodes of the cluster of computing nodes for implementing an assessment of health; identifying a quora of computing nodes of the cluster of computing nodes, the quora of computing nodes including a subset of computing nodes within the cluster of computing nodes having hardware components that are homogeneous; signaling, via the assessment interface, the administrative computing node to cause the quora of computing nodes to execute the assessment of health, wherein executing the assessment of health includes: defining, for each test cycle of a plurality of test cycles of the assessment of health, a plurality of distinct pairs of computing nodes from the quora of computing nodes, wherein each test cycle of the assessment of health assesses a different combination of paired computing nodes of the plurality of distinct pairs of computing nodes; implementing a bi-directional testing by each pair of computing nodes of the plurality of distinct pairs of computing nodes; evaluating bi-directional testing data obtained based on the execution of the assessment of health of the quora of computing nodes; classifying at least one computing node of the quora of computing nodes as unhealthy when the evaluation indicates that a subset of the bi-directional testing data associated with the at least one computing node fails to satisfy one or more benchmark node performance values; and altering the quora of computing nodes by removing the at least one computing node to mitigate a likely performance degradation of the cluster of computing nodes.

In one or more embodiments, ordering the plurality of distinct pairs of computing nodes based on descending performance metrics; applying the one or more benchmark node performance values against the ordering of the plurality of distinct pairs of computing nodes, wherein classifying the at least one computing node of the quora of computing nodes as unhealthy is based on the application of the one or more benchmark node performance values against the ordering of the plurality of distinct pairs of computing nodes.

In one or more embodiments, the health assessment includes a drop out and accumulation health assessment that per iteration of the node health assessment against the quora of computing nodes: drop outs a given computing node as identified as unhealthy from the quora of computing nodes by altering the quora of computing nodes to exclude the given computing node, and accumulates computing nodes not identified as unhealthy within the quora of computing nodes by maintaining member computing nodes of the quora of computing nodes to a subsequent iteration of the node health assessment.

BRIEF DESCRIPTION OF THE FIGURES

FIG. 2 illustrates an example method in accordance with one or more embodiments of the present application;

FIG. 8 illustrates another example method in accordance with one or more embodiments of the present application;

FIG. 9 illustrates a schematic of an example target computing node and an example golden computing node in accordance with one or more embodiments of the present application;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Enhanced Cluster Health Management and Unhealthy Node Detection

Figure 1:
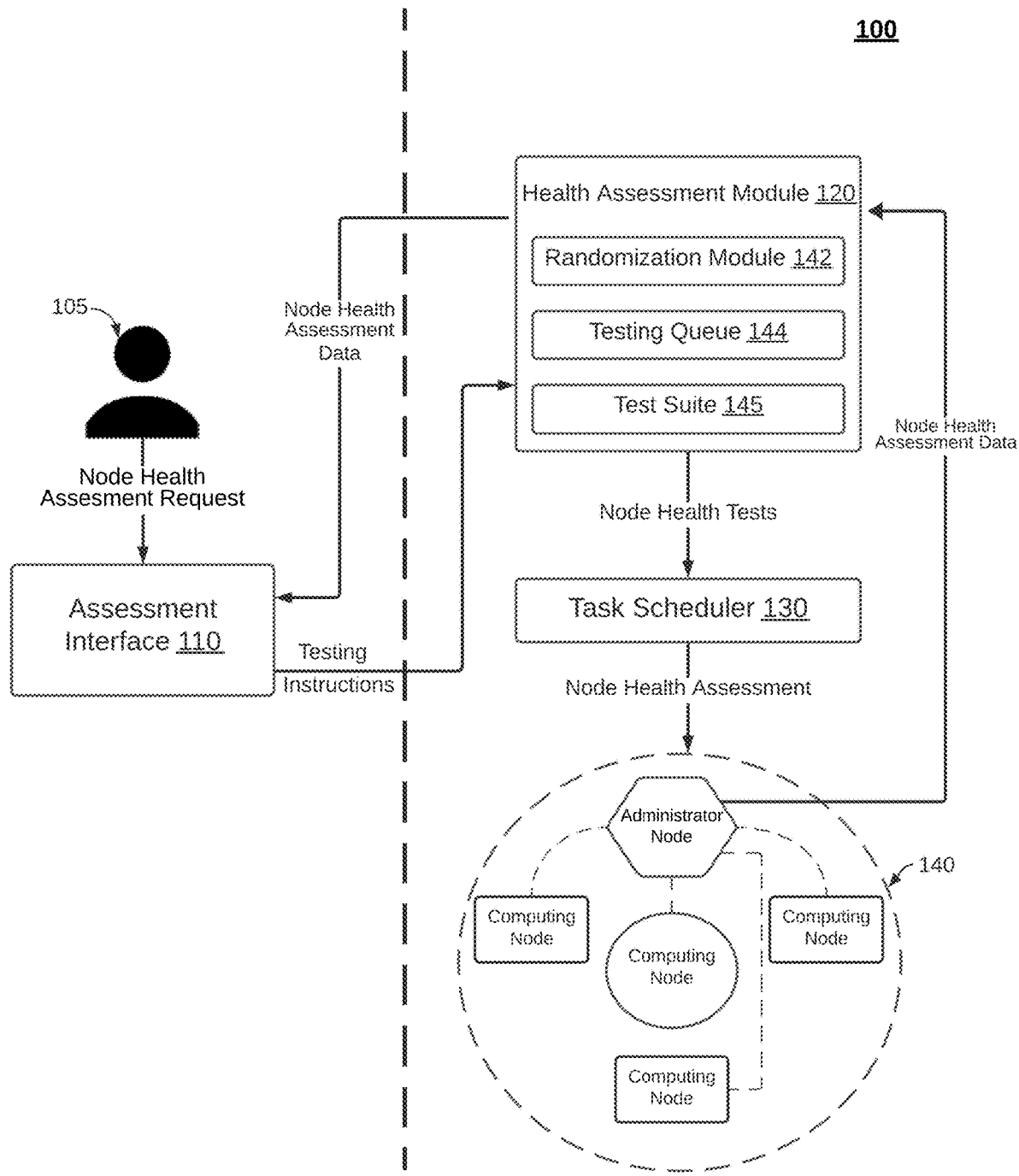
FIG. 1 illustrates a schematic representation of a system in accordance with one or more embodiments of the present application.
Figure 1A:
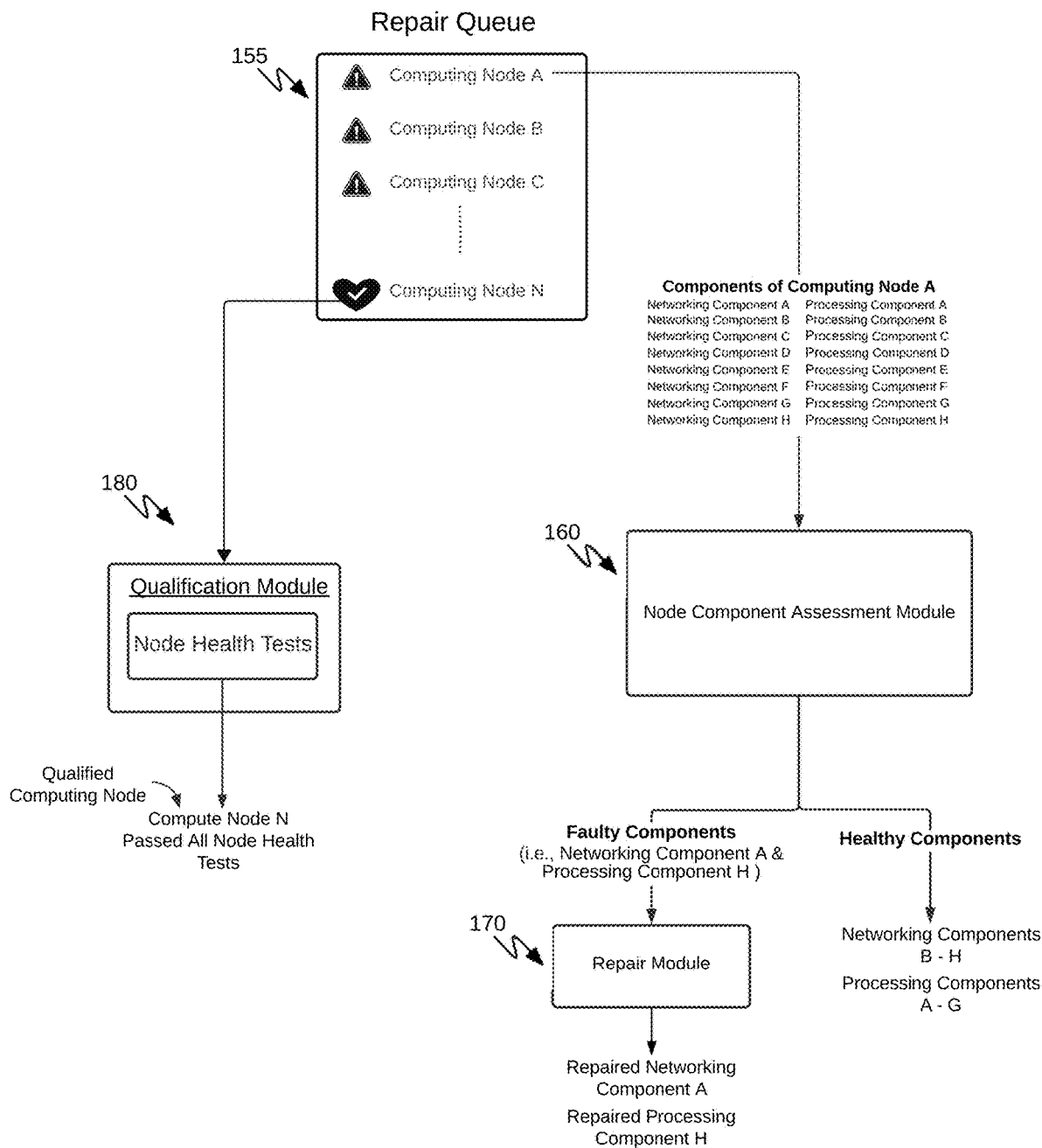
FIG. 1A illustrates a schematic representation of a subsystem of the system in accordance with one or more embodiments of the present application.

As shown in FIG. 1, a system 100 implementing enhanced cluster health management and for detecting unhealthy computing nodes within a cluster of computer nodes includes a node health assessment interface 110, a health assessment module 120, and a task scheduler 130 for assessing the health of a cluster of computing nodes 140.

1.1 Computing Node Health Assessment Interface

The node health assessment interface 110, which may also be referred to herein as assessment interface no, preferably includes a command interface or system programming interface or console through which an administrator 105 may operate to execute a node health assessment of a target cluster of computing nodes 140. In a preferred embodiment, the assessment interface no is preferably implemented by one or more computers and may be in operable control communication with one or more computing nodes of a target cluster of computing systems. In such preferred embodiment, the assessment interface 110 may function to receive, as input, one or more user commands for executing one or more aspects of a node health assessment of a target cluster of computing nodes 140 and output control signals to the one or more computing nodes of the target cluster of computing nodes 140.

In one or more embodiments, the one or more computing nodes of a target cluster of computing nodes 140 that may be operably controlled via the assessment interface 110 preferably include an administrator node. In such embodiments, the administrator node comprises one computing node of the target cluster of computing nodes 140 that may be in network communication with all computing nodes of the target cluster of computing nodes 140. The administrator node executing commands or instructions from the assessment interface 110 may function to administer any suitable tests to the target cluster of computing nodes 140 including, but not limited to, a node health assessment. In some embodiments, the administrator node may be referred to herein as a head node or a control node depending on its operation within the cluster of computing nodes 140. Accordingly, the administrator node 105 may have installed cluster management software or similar applications that preferably enables the administrator node 105 to coordinate activities of the cluster of computing nodes 140, manage resource allocation, perform scheduling (e.g., integrated scheduler 130), and/or support maintaining an overall health of the cluster of computing nodes 140.

Additionally, or alternatively, the administrative node may be in operable control communication of a parallel file system or the like for administering any suitable tests, including a node health assessment, to a target cluster of computing nodes 140. Additionally, or alternatively, the administrative node may include an assessment agent installed thereon that may be in communication and operably controlled via commands from the assessment interface 110. In some embodiments, the assessment agent of the administrator node based on command inputs from the assessment interface 110 may function to automatically execute one or more operations or functions of a node health assessment against a target cluster of computing nodes 140.

1.2 Health Assessment Module

The health assessment module 120, in one or more embodiments, which is in operable communication with one or more of the assessment interface 110, the node assessment scheduler 130, and cluster of computing nodes 140 may operate to configure one or more node health assessments and/or execute one or more node health assessments against a target set of computing nodes of the cluster of computing nodes 140. In one or more embodiments, the health assessment module 120 may function to store and/or have access to a test suite 145, which is sometimes referred to herein as a pool of node health tests, that includes a plurality of node health tests. At runtime, the health assessment module 120 may function to source from the test suite 145 one or more node health tests, which may be executed either serially or in parallel against computing nodes of the cluster of computing nodes 140.

In one or more embodiments, the health assessment module 120 may be implemented in cooperation with a network file system, a parallel file system or the like. In such embodiments, the health assessment module 120 may be implemented by an administrative computing node of a target cluster of computing nodes, the administrative computing node may be sometimes referred to herein as a "head node" or "node zero". Additionally, or alternatively, each computing node in the target cluster of computing nodes may store a copy of the tests and/or assessments associated with an operation of the health assessment module 120. In this way, commands and/or signals from the health assessment module 120 may cause any or each of the computing nodes of the target cluster to access one or more tests and/or assessments and execute the tests or assessments concurrently. In such embodiments, the outputs of the execution of the tests and/or assessments by the target cluster of computing nodes may be stored to or served out to the network file system.

Additionally, or alternatively, the health assessment module 120 may function to implement and/or include one or more of a randomization module 142 and a testing queue 144 that may operate together for initializing and executing a node health assessment of computing nodes of a cluster of computing nodes 140. In one or more embodiments, the randomization module 142 may function to ensure that different first computing nodes are seeded to prevent biased results on the basis of an initial computing node selection from a batch of computing nodes subject to a node health assessment.

1.3 Automated Task Scheduler

The task scheduler 130 preferably functions as an orchestration layer that automatically facilitates a node health assessment. In a preferred embodiment, the task scheduler 130 may function to integrate node health assessments directly into an operational workflow of the cluster of computing nodes 140. Accordingly, the task scheduler 130 may be multi-faceted in its automated application of node health assessments on a predetermined schedule or dynamically during a pre-job deployment of a batch of computing nodes.

In one or more embodiments, the task scheduler 130 may function to continually and/or periodically monitor a state of computing nodes within the cluster of computing nodes 140 to identify idle computing nodes that are not currently allocated to user jobs. In such embodiments, the task scheduler 130 may batch the idle computing nodes to the node testing queue 144 for a node health assessment.

1.4 Cluster of Computing Nodes

The cluster of computing nodes 140 preferably includes a plurality of distinct computing nodes where each distinct node comprises a computer. In a preferred embodiment, the computer typically includes a server-grade machine, equipped with one or more of central processing units (CPUs), graphical processing units (GPUs), both, or similar processing components capable of executing tasks and running applications. In one or more embodiments, the plurality of distinct computing nodes in a cluster may include network interconnects comprising high-speed communication pathways that link the computing nodes together, facilitating rapid data transfer. One or more examples of network interconnects may include, but should not be limited to, InfiniBand, Ethernet, fiber-optic connections that may enable the computing nodes to operate in concert for distributed computing tasks.

Additionally, or alternatively, a cluster of computing nodes may include a storage system having an associated memory or data storage solutions that may range from local disk drives within each computing node of the cluster of computing nodes 140 to shared storage systems, such as storage area network (SAN) or network attached storage (NAS), accessible by all computing nodes in cluster 140 for distributed file systems and data persistence. In a preferred embodiment, the cluster of computing nodes 140 preferably employs a parallel file system that allows multiple computing nodes to access and process data simultaneously, which may increase throughput and efficiencies of the computing nodes.

1.5 Subsystem for Faulty Component Detection

In one or more embodiments, system 100 includes the subsystem 150 for enhanced identification and/or detection of faulty components of a suspected unhealthy computing node, as shown by way of example in FIG. 2. Subsystem 150 preferably functions to evaluate a component health of a target computing node that may have been classified as being unhealthy. That is, in one or more embodiments, subsystem 150 in operation may function to identify and/or characterize one or more faulty components of a target computing node by executing a component node health assessment for one or more hardware and/or software components of the target computing node.

In some embodiments, the subsystem 150 may include or may be in operable communication with a repair queue 155, a node component assessment module 160, a repair module 170, and a qualification module 180. The repair queue 155 preferably includes a data structure or the like storing a listing or mapping of one or more computing nodes having a classification of an unhealthy state. In other words, the repair queue 155 preferably functions to itemize computing nodes that may need repair resulting from non-performant components or similar hardware or software failures. The repair queue 155, in such embodiments, may include a listing of unhealthy computing nodes together with associated node health assessment data observed or collected from one or more upstream health assessments (e.g., node health assessment module 120 or the like).

The node component assessment module 160, which is sometimes referred herein as the "node component health assessment module" preferably functions to assess a relative health of the components of a target computing node. In some embodiments, the node component assessment module 160 sources or identifies a target computing node for an assessment from repair queue 155, however, it shall be recognized that node component assessment module 160 may identify or receive a target computing node for an assessment from any source. In one or more embodiments, the node component assessment module 160 may function to prepare the components of a target computing node for testing by generating a plurality of unique combination of node component pairs based on an input of a listing or the like of the components of the target computing node and a listing or the like of the components of a healthy (i.e., golden model) target computing node. In a preferred embodiment, node component health assessment module 160 may function to compute a Cartesian product between the set of components of the target computing node (e.g., unhealthy computing node) and the set of components of the healthy computing node. As a result, node component health assessment module 160 may function to generate or output a listing or a mapping of all possible unique pairings between the components of the target computing node and the healthy computing node for peer-to-peer testing and/or the like.

Additionally, or alternatively, node component assessment module 160 may have access to a node component test suite that includes a plurality of tests for evaluating various components of a computing node. In some embodiments, node component assessment module 160 may implement a test selection matrix (not shown) that includes a mapping between distinct components mapped to or associated with one or more available tests for evaluating the associated components.

In use, node component assessment module 160 preferably performs an assessment of the components of a target computing node and may function to output one or more signals or classifications indicating whether a component of the target computing node is healthy or faulty. In the circumstances in which a component is classified by node component assessment module 160 as faulty, node component assessment module 160 may route data associated with the component classified as being faulty (i.e., the faulty node component) to repair module 170 for remediating the one or more faults or defects of the target computing node.

In one or more embodiments, once a computing node has been repaired via one or more operations associated with the repair module 170, the qualification module 180 may be implemented for ensuring that the repaired computing node is healthy and readied to return to service. In such embodiments, the qualification module 180 may function to execute a standard suite of health tests against the repaired computing node that may confirm or validate that the repairs to the repaired computing node are successful. In a variation, the qualification module 180 may function to execute a select set of health tests based on the one or more node components that were repaired. In such variation, the qualification module 180 may function to select one or more tests that map to a fault type or previously faulty node components for qualifying the repaired computing node. In response to a successful qualification (e.g., satisfaction of the one or more node health tests), the qualification module 180 may function to flag and/or identify the repaired computing node as being ready for service. Conversely, if the qualification is unsuccessful, the qualification module 180 may function to route the repaired computing node upstream to one or more of the health assessment module 120, the subsystem 150, and/or any other module or component of the system 100 for identifying a health state of the repaired computing node and/or fault characterization of one or more components of the repaired computing node.

2. Method for Enhanced Cluster Health Management and Unhealthy Node Detection

As shown in FIG. 2, a method 200 implementing enhanced cluster health management and for detecting unhealthy computing nodes within a cluster of computer nodes includes configuring a health assessment for a set of computing nodes S210, executing a health assessment for the set of computing nodes S220, identifying health assessment observations of the set of computing nodes S230, and mitigating unhealthy nodes from a cluster of computing nodes S240, and handling non-performant or unhealthy computing nodes S250.

The method 200 as implemented by one or more systems (e.g., system 100) preferably provides a scalable solution for monitoring and maintaining the health of computing clusters by detecting un-reported technical issues. In particular, the method 200 in various embodiments functions to systematically identify underperforming computing nodes and/or components and thereby aids in a prevention of performance degradation and further extends a reliable operation of the hardware of a cluster of computing nodes.

2.10 Node Health Assessment Configuration

S210, which includes configuring or setting one or more node health assessment parameters, may function to define via assessment interface no or the like parameters for testing the operational health of a set of computing nodes within a cluster of computing nodes. In one or more embodiments, the one or more node health assessment parameters may function to define one or more conditions and/or one or more bounds that govern an operation and/or execution of a given node health assessment of a cluster of computing nodes.

In one or more embodiments, configuring or setting the one or more node health assessment parameters may include defining or setting criteria of a basis block unit. A basis block unit, as referred to herein, preferably relates to a minimum chunk of an allocatable computing resource for testing collectives. In the case of performing health assessment tests for a cluster of computing nodes, a basis block unit may be defined by three or more available computing nodes within a cluster of computing nodes. Additionally, or alternatively, in the case of performing health assessment tests of computing components, a basis block may similarly be a minimum of three or more allocatable computing components (e.g., graphic processing units, networking cards, etc.) that are accessible and available for collective testing.

Additionally, or alternatively, in some embodiments, a basis block unit may be a fundamental computing unit or node that is sufficiently healthy for performing fundamental and/or desired computing and/or interconnect tasks. It shall be recognized that a basis block unit may be defined in any suitable manner that considers operational fault tolerances and/or minimum performance requirements such that a basis block unit may include an amount of non-performant components but may still satisfy criteria for a given basis block unit.

Accordingly, in operation, a system (e.g., system 100 or a service) implementing method 200 may function to receive, as input, a specification data for defining a basis block unit. In such embodiments, once the specification data is received, the method 200 and/or the system executing the method 200 encodes or sets a basis block unit as an initialization parameter of a given node health assessment.

In one or more embodiments, configuring or setting the one or more node health assessment parameters may include defining or setting an extent of a node health assessment. In such embodiment, S210 may function to define or set a value of an upper limit parameter that sets a largest size of a node health assessment. That is, the upper limit parameter may define a maximum number of computing nodes that may be assessed or tested during a given session of a node health assessment. In operation, an arbitrary number of nodes may be testable or assessed via a node health assessment, however, a delimitation of an upper limit or maximum number of testable nodes may ensure an availability of computing nodes for executing jobs and/or various computing tasks. As a non-limiting example, a maximum number of computing nodes that may be tested at a given time or during a given node health assessment may be limited to ten (10) or twenty (20) basis block units. In such non-limiting example, if the upper limit of testable basis block units is 20, the given node health assessment may function to cap a node testing such that a quora of testable nodes of a cluster of computing nodes may include less than the upper limit parameter but not exceed the upper limit parameter.

Additionally, or alternatively, configuring or setting the one or more node health assessment parameters may include selecting a suite of tests or assessments to apply in the node health assessment of target computing nodes in a cluster of computing nodes. In one or more embodiments, S210 may enable a selection of a suite of tests from a pool of pre-existing tests and/or test scripts. In such embodiments, the selection of one or more tests from the pool of tests that define the suite of tests may be based on attributes (e.g., node model, hardware type, hardware components, and the like) of the target computing nodes subject to the node health assessment. In a variation of this embodiment, S210 may enable a custom creation of test scripts or node health tests, which may be added in the suite of tests for execution in the node health assessment.

Additionally, or alternatively, S210 may function to configure an application of the suite of tests during the node health assessment. In one or more embodiments, based on test application parameters, S210 may function to execute node health assessments across a plurality of computing nodes in parallel and/or in tandem. That is, in a parallel application of a node health assessment, a same suite of tests may be applied to a set of computing nodes at the same time or substantially the same time thereby allowing for a scaled and accelerated evaluation of multiple computing nodes. As such, at least one technical advantage of such embodiments includes improved efficiency in an evaluation of many computing nodes allowing for a detection of an unhealthy node faster than existing testing mechanisms.

2.20 Node Health Assessment: Configuration Phase

S220, which includes executing a node health assessment of a set of (or target) computing nodes of a given cluster of computing nodes. In a preferred embodiment, the execution of the node health assessment of the set of computing nodes may be based on or informed by the one or more node health assessment parameters, as described in S210. Additionally, or alternatively, executing a node health assessment may be considered as a multi-part implementation in which an initialization and/or a configuration of one or more modules or testing components of a node health assessment may be performed in a first phase and an execution of the tests of the node health assessment may be performed in a second phase. It shall be recognized that while, in some embodiments, a node health assessment may be implemented in multiple parts or multiple phases, in other embodiments, the node health assessment may be contiguously implemented in a single phase.

Accordingly, a node health assessment for a set of computing nodes may be based on a combination of predefined and dynamic criteria. In one or more embodiments, the predefined criteria may include manufacturer specifications and past performance logs, while dynamic criteria could involve real-time workload demands and network activity. Thus, the assessment configuration phase, as described herein, preferably allows for the tailoring of node health assessments to the specific architecture and use cases of the cluster of computing nodes thereby enhancing the precision of the detection process of unhealthy or non-performant computing nodes.

Assessment Configuration Phase: Idle Computing Nodes

In one or more embodiments, executing the node health assessment may include an initial phase that may include identifying a set of testable computing nodes of a target cluster of computing nodes. A target cluster of computing nodes may, in some embodiments, include a combination of active computing nodes and idle computing nodes. In a preferred embodiment, S220 may function to identify, as testable computing nodes, the idle computing nodes of the target cluster of computing nodes and, optionally, select at least a subset of the idle computing nodes for testing via the node health assessment. In this preferred embodiment, S220 may function to select idle computing nodes which preferably relate to computing nodes without impending computing jobs, user jobs, and/or interconnect tasks. In this way, a testing of a currently idle set of computing nodes may not interfere with one or more computing jobs and/or interconnect tasks intended for the idle computing nodes at a future time or interfere with active jobs being executed by active computing nodes of the target cluster of computing nodes.

Figure 3:
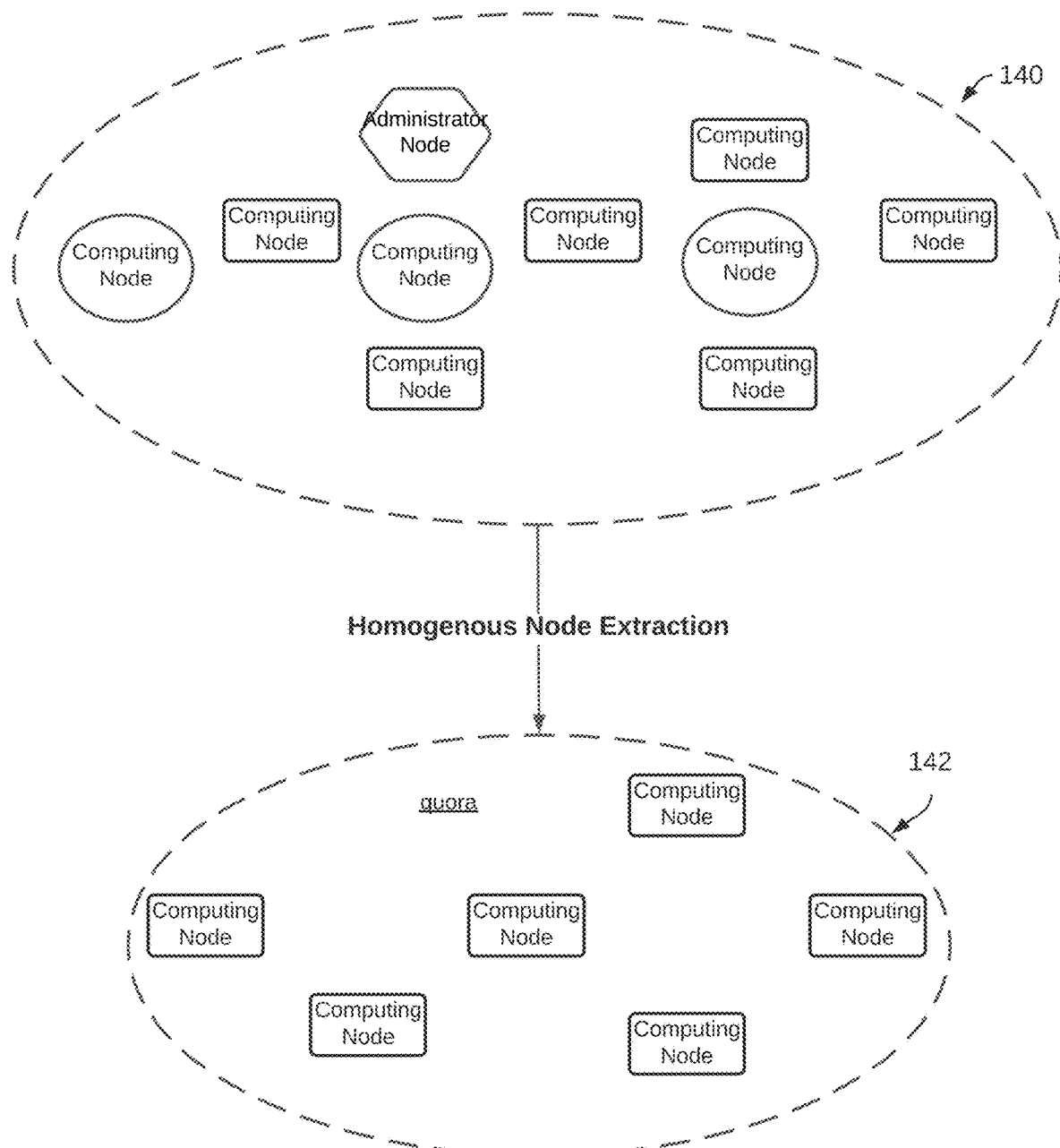
FIG. 3 illustrates an example of homogeneous node identification in accordance with one or more embodiments of the present application.

In a preferred embodiment, S220 may function to select from the set of idle computing nodes only the idle computing nodes that may be homogeneous (e.g., same model server or same components) rather than heterogeneous, as shown by way of example in FIG. 3. Because the set of idle computing nodes may include computing nodes having heterogeneous structures and/or compositions (e.g., varying interconnect/networking bands, varying processing units, etc.), S220 preferably selects for inclusion in a batch for a node health assessment only idle computing nodes that may be homogeneous in type, structures and/or compositions. In such embodiments, the homogeneity of the idle computing nodes being evaluated in a given node health assessment ensures valid collective testing, which may include point-to-point, peer-to-peer testing and/or similar testings. That is, in a given node health assessment that includes a pool or suite of tests or testing scripts, heterogeneous computing nodes may theoretically execute the suite of tests differently in peer-to-peer testing thereby causing an inability to compute valid results in the peer-to-peer comparisons. Conversely, homogeneous computing nodes executing a same pool of tests should behave similarly, assuming the computing nodes are not errant or otherwise non-performant for one or more reasons relating to the operability of their hardware and/or software components.

It shall be recognized that while in preferred embodiments, homogeneous computing nodes may be grouped into a batch for a node health assessment, in other embodiments, heterogeneous computing nodes may also be grouped for a node health assessment. In such other embodiments, a group of heterogeneous computing nodes may include one or more components that may be homogeneous among the heterogeneous computing nodes in the group. Accordingly, in such variation, S220 may enable a node health assessment on the basis of evaluating homogeneous components (e.g., same model GPUs) within a group of heterogeneous computing nodes.

Assessment Configuration Phase: Node Testing Queue

Additionally, or alternatively, once a set of idle computing nodes may be identified as likely candidates for a node health assessment, S220 may function to reserve the set of idle computing nodes for collective testing by grouping at least a subset of the idle computing nodes into a node testing queue 144 or the like. In one or more embodiments, once the group or set of idle computing nodes are moved into a reserved state in which the idle computing nodes are set aside for testing, the group of idle computing nodes may be referred to as a group of reserved computing nodes since during a testing phase the computing nodes become active and are no longer idle during an execution of one or more tests by computing nodes within the group of reserved computing nodes. Conversely, upon completion of a node health assessment of the group of reserved computing nodes, the method 200 may function to revert or alter the state of the group of reserved computing nodes to idle computing nodes by moving the computing nodes from the node testing queue 144 to a queue for idle computing nodes. The node testing queue 144, as referred to herein, preferably refers to a dedicated virtual space and/or memory in which idle computing nodes that have been selected and/or marked for testing may be itemized or enumerated by one or more unique identifiers of the selected idle computing nodes and made available for various testings via the node health assessment. Accordingly, in or more embodiments, the node testing queue 144 may function as a mechanism for orchestrating a given node health assessment of a target set of computing nodes within a cluster of computing nodes 140.

In a preferred embodiment, S220 may function to ensure that a sufficient number of idle computing nodes are added to the node testing queue 144 satisfying a lower bound parameter and/or lower limit parameter/threshold identifying a minimum number of computing nodes that should be tested in a given node health assessment. In such preferred embodiment, the node testing queue 144 is populated with a set of idle computing nodes selected from a target cluster of computing nodes 140, preferably employing a randomization algorithm preventing bias in a selection process of the population of idle computing nodes. The randomization algorithm preferably ensures varied starting or seeding nodes for each test sequence thereby mitigating the risk of consistent underperformance from any single computing node that may skew the results of a node health assessment. For instance, in some embodiments, a node health assessment test may be benchmarked against an initial peer-to-peer testing between two computing nodes, which may be seeded with a non-performant computing node. In such embodiments, the resulting performance data if propagated as a benchmark for downstream testing of other computing nodes may unfavorably skew testing results such that other non-performant computing nodes may not be detected due to using a benchmark having degraded performance results.

Additionally, or alternatively, S220 may function to ensure that a number of computing nodes added to the node testing queue 144 does not exceed an upper limit parameter identifying a maximum number of computing nodes that should be tested in a given node health assessment. In this way, an availability of computing nodes with a target cluster of computing nodes 140 may be preserved for potential computing jobs and/or networking tasks.

Assessment Configuration Phase: N−1 Drop Out Testing

Figure 4:
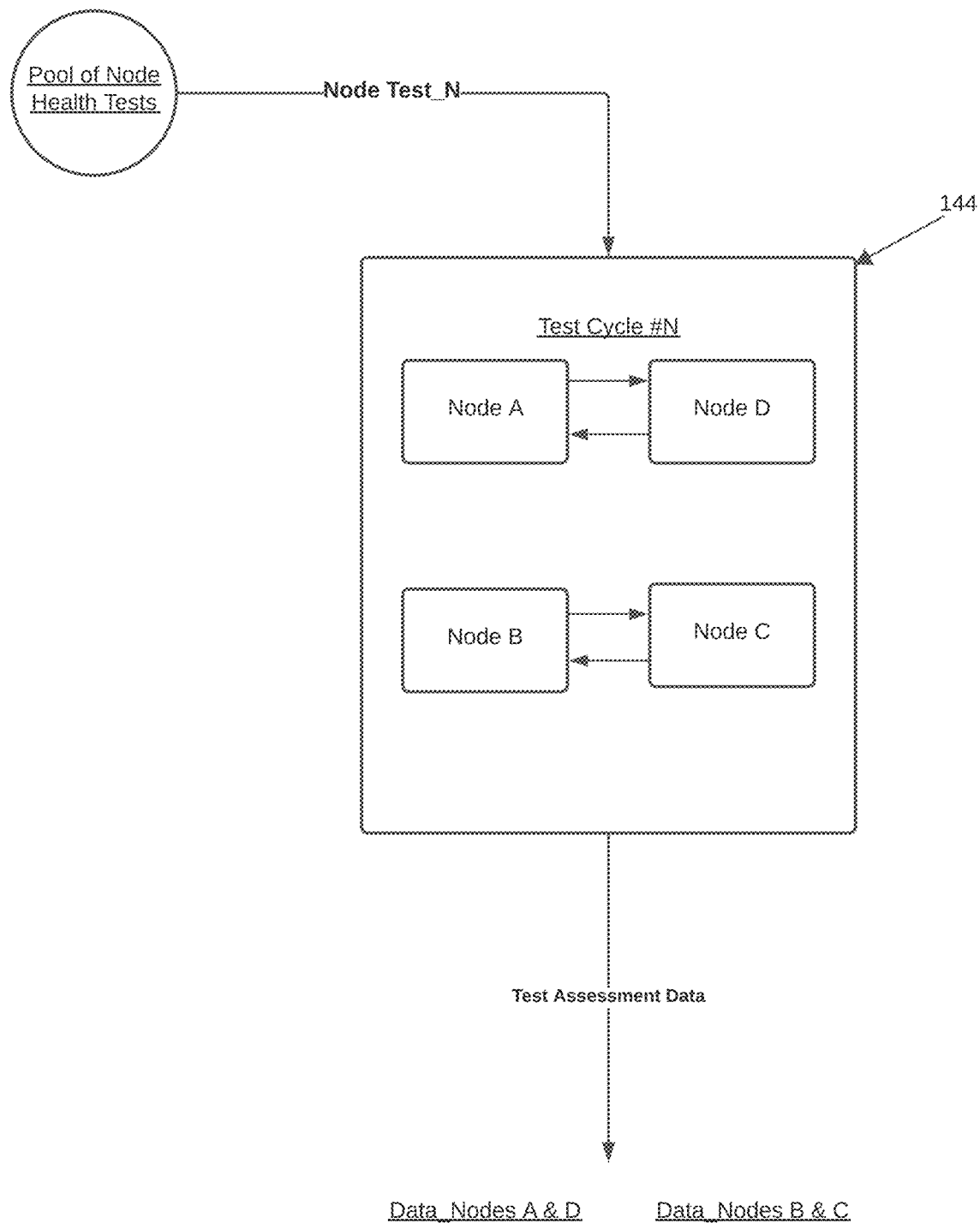
FIG. 4 illustrates an example implementing a testing cycle of a node health test subject to n−1 testing in accordance with one or more embodiments of the present application.

Additionally, or alternatively, S220 may function to configure the node testing queue 144 according to n−1 testing. In one or more embodiments, S220 may function to subject the node testing queue 144 to n−1 testing which governs a bi-directional assessment between pairs of idle computing nodes assigned to the node testing queue 144, as shown by way of example in FIG. 4. In such embodiments, "n" preferably represents the number of idle computing nodes or computing node components that may be grouped or batched into the node testing queue 144 and accordingly, when the node testing queue 144 is subjected to n−1 testing preferably causes the node testing queue 144 and/or a node health assessment module to generate a plurality of distinct testing combinations that include possible paired combinations of the idle computing nodes within the node testing queue 144 while excluding at least one idle computing node or a paired combination of idle computing nodes within the node testing queue 144. Accordingly, in one or more embodiments, the term "n" may represent a total number of nodes in a batch or group of idle computing nodes being considered for a node health assessment test assigned to a node testing queue 144. Stated differently, during n−1 testing, a given idle computing node or a given paired combination of idle computing nodes may be systematically excluded in each test iteration to determine an impact of the given idle computing node or the given paired combination of computing nodes on an overall performance of batch of idle computing nodes within the node testing queue 144.

Figure 5:
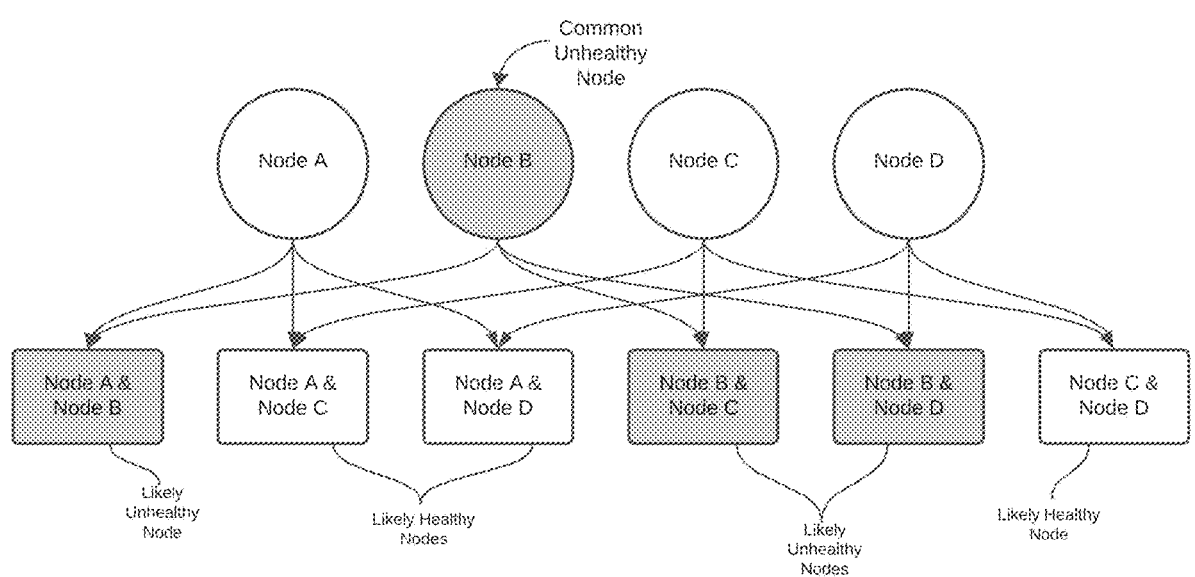
FIG. 5 illustrates an example of a delineation of likely healthy and likely unhealthy node pairings in accordance with one or more embodiments of the present application.

As a non-limiting example, a group of "n" idle computing nodes may be identified or selected for testing. In this example, the group of idle computing nodes may include Node A, Node B, Node C, and Node D selected from a cluster of computing nodes 140 and populated as a batch assigned to a node testing queue 144 that may be subject to n−1 testing. As shown by way of example in FIG. 5, a total of six (6) distinct paired combination of idle computing nodes may be delineated (i.e., Nodes A & B, Nodes A & C, Nodes A & D, Nodes B & C, Nodes B & D, and Nodes C & D) for the node health assessment. Accordingly, in this example, because there are 6 paired combinations of idle computing nodes, a total of 6 testing cycles may be executed, which may exclude or drop out a different paired combination of idle computing nodes in each cycle.

Accordingly, in one or more embodiments, the n−1 testing configuration of the node testing queue 144 enables a system or service executing the node health assessment to systematically identify faulty or likely faulty computing nodes within a batch by systematically excluding a given computing node or pair of computing nodes during an instance of testing and thereby exclude or drop out (from subsequent testing cycles) each faulty node at a time while allowing the computing nodes remaining the batch to potentially accumulate as performant or good basis block units. Additionally, or alternatively, S220 may function to configure batch sizes of the computing nodes to mitigate seeding a node health assessment with values from a faulty computing node or the like. By setting the batch sizes of (idle) computing nodes to relatively small numbers, benchmarking with testing values from a faulty computing node may only affect an assessment of only a limited number of other computing nodes within the small batch.

2.30 Node Health Assessment: Assessment Execution Phase

S230, which includes executing a node health assessment, may function to execute collective testing, which may include point-to-point, peer-to-peer testing and/or similar testings of a quora of computing nodes enabling a detection of non-performant computing nodes (e.g., drop out) from the quora and a maintenance of performant computing nodes (e.g., accumulation) within the quora. Accordingly, based on the configuration of a node health assessment in one or more embodiments, the node health assessments may be executed by sending diagnostic commands from an administrator node 105 or the like to each computing node of the quora. In such embodiments, command signals may prompt the quora of computing nodes to perform bi-directional tests and self-tests and report back to the administrator node 105. The execution phase of a node health assessment may be optimized by the node health assessment parameters to minimize performance disruptions, often scheduling the most resource-intensive tests during off-peak hours (e.g., times with the most idle computing nodes).

Scaled Node Health Assessment

In a first implementation, S230 may function to execute a scaled execution of a given node health assessment. In this first implementation, if a number of idle computing nodes that may be a target of a given node health assessment satisfies or exceeds a scaled assessment threshold, S230 may function to execute the given node health assessment of one or more batches of the idle computing nodes by subjecting the node testing queue 144 to n−1 testing. The scaled assessment threshold preferably relates to a maximum number of computing nodes that may typically be tested using a different testing technique for lower volume of test subjects, such as pairwise testing.

In one or more embodiments of this first implementation, S230 may function to execute bi-directional testing of paired combinations of idle computing nodes within a node testing queue 144. The bi-directional testing, as referred to herein, preferably includes a testing mechanism that measures the performance between pairs of computing nodes by causing a given pair of computing nodes to execute one or more tests of a node health assessment via data transmissions to each other and/or processing operations between each other. In such embodiments, by testing in both directions of a paired combination of idle computing nodes, bi-directional testing simulates a likely real-world usage with higher accuracy than unidirectional testing thereby providing an improved assessment of how the paired combination of idle computing nodes may perform under normal or real-world operating circumstances.

Accordingly, in circumstances in which the health of network interconnects may be important for the performance of processing components (e.g., GPUs, CPUs, etc.) of a target cluster of computing nodes 140, bi-directional testing may ensure that fiber-optic networks and associated networking components (e.g., network cards) used to connect processing components (e.g., GPU servers) are capable of operating peak performance of high-speed, two-way data transmission.

In one or more embodiments, each paired combination of idle computing nodes may be bi-directionally tested for performance according to one or more standardized and/or node health tests that may be selected from a pool of node health tests. In one or more embodiments in which the node health assessment includes a plurality of distinct node health tests, S230 may function to execute one or more of the plurality of distinct node health tests serially and/or in a parallel manner. In the one or more embodiments in which the pool of node health tests may be executed serially, S220 may function to derive or define a testing sequence in which the plurality of node health tests may be arranged in an order in which the node health tests will be executed, such that when a given node health test within the testing sequence is completed, a node health test following the given node health test may be automatically executed against the batch of idle computing nodes.

Conversely, or additionally, in one or more embodiments, the pool of node health tests of a node health assessment may be executed in parallel such that a given paired combination of idle computing nodes may be subject to multiple node health tests at the same time; that is, two or more node health tests may be applied to a paired combination of idle computing nodes at the same time. In such embodiments, the two or more node health tests applied against a paired combination of idle computing nodes may be applied against different components of the paired combination of idle computing nodes. As a non-limiting example, a first node health test of a set of node health tests being applied in a parallel manner against a paired combination of idle computing nodes may function to test a networking component (e.g., networking cards) while a second node health test operates to test a processing component (e.g., GPUs) of the paired combination of idle computing nodes.

Pairwise Accumulation and Drop Out

In a second implementation, idle computing nodes added to a node testing queue 144 may be subject to pairwise testing via a node health assessment. In one or more embodiments, if a number or scale of computing nodes that may be targets for a node health assessment does not satisfy a node testing threshold (i.e., a minimum of three computing nodes, minimum of three homogeneous node components, and the like), S220 may function to enable simple pairwise testing of the target idle computing nodes within a batch. In such embodiments, S220 may function to bi-directionally test distinct pairs of idle computing nodes on a pair-by-pair basis (e.g., one pair at a time) to identify non-performant computing nodes.

2.40 Health Assessment Data & Metrics|Unhealthy Node Detection

S240, which includes detecting an unhealthy computing node, may function to collect or source node performance metrics and/or observations from an execution of a given node health assessment and preferably, deduce non-performant (e.g., unhealthy) and/or performant (e.g., healthy) computing nodes based on analysis of the node performance metrics and/or observations.

In one or more embodiments, the observations data and/or node performance metrics resulting or derived from an execution of one or more node health assessments may be categorized into various levels of severity or into a hierarchy of severity. In such embodiments, a real-time or near real-time analysis of the observations data trigger immediate responses for bypassing one or more intermediate node health assessment actions or processes (e.g., node health verification or the like) and accelerating mitigation actions that may ameliorate any degradative effects of an unhealthy node. Accordingly, the system executing the method 200 may be configured to differentiate between transient issues and persistent problems within a cluster of computing nodes 140 that could signify an unhealthy computing node.

In one or more embodiments, S240 may function to obtain or derive one or more node testing data metrics relating to, but not limited to, throughput metrics, bandwidth metrics, latency metrics, error rates in a transmission of data, and/or any derivable metric measuring an efficacy or other performance attributes of a target set of computing nodes. Accordingly, as computing nodes of a target batch of computing nodes are being tested, S240 may function to collect summary statistics and/or metrics for each paired combination of idle computing nodes thereby enabling the method 200 to determine which computing nodes should be made available for user jobs and which should be subjected to further testing and/or maintenance and repair.

Figure 6:
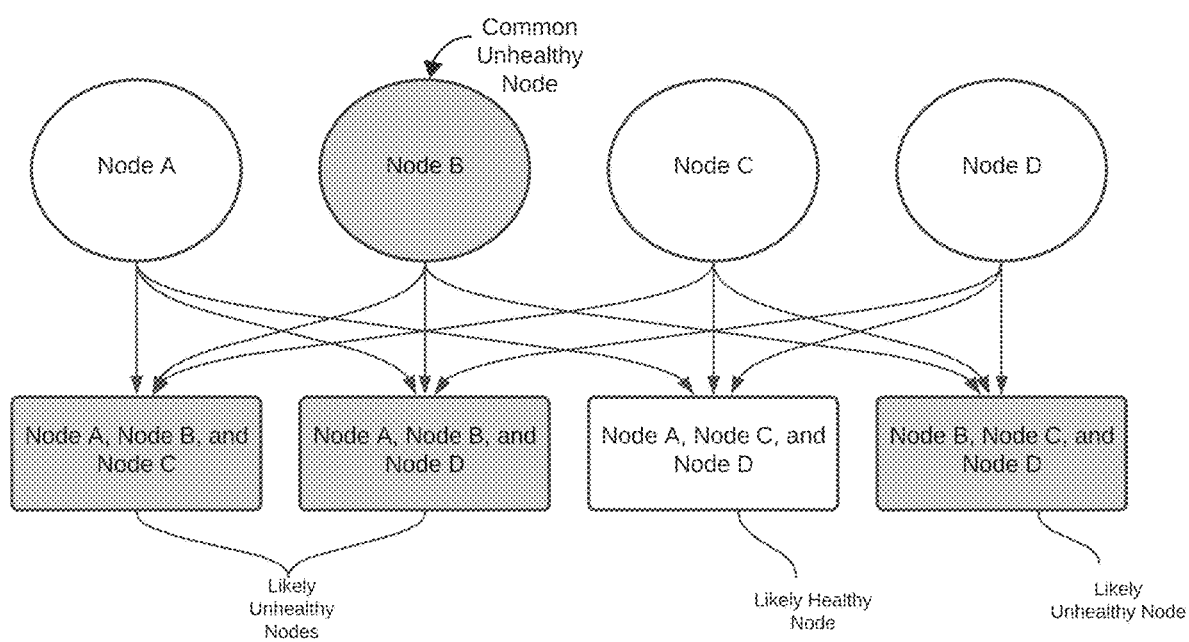
FIG. 6 illustrates an example of deducing a likely unhealthy node based on a common denomination of a node in accordance with one or more embodiments of the present application.

In a first implementation, S240 may function to identify or detect non-performant computing nodes based on deducing a likely faulty computing node based on performance metrics collected during each of a plurality of cycles of an n−1 testing of a batch of idle computing nodes. In this first implementation, S240 may function to identify non-performant paired combinations of idle computing nodes from each cycle of the n−1 testing of the batch. A non-performant paired combination of idle computing nodes preferably relates to a pairing whose metrics that does not satisfy a performance benchmark (e.g., minimum operating or normal operating metrics, or the like). S240 evaluating each testing cycle, may function to extract or identify groups of non-performant paired combinations of idle computing nodes in which one of the idle computing nodes is common to each non-performant paired combination of idle computing nodes. In such embodiments, S240 may generate an inference identifying the idle computing node that is common among the non-performant paired combination of idle computing node is likely a faulty or errant computing node, as shown by way of example in FIG. 6.

Figure 7:
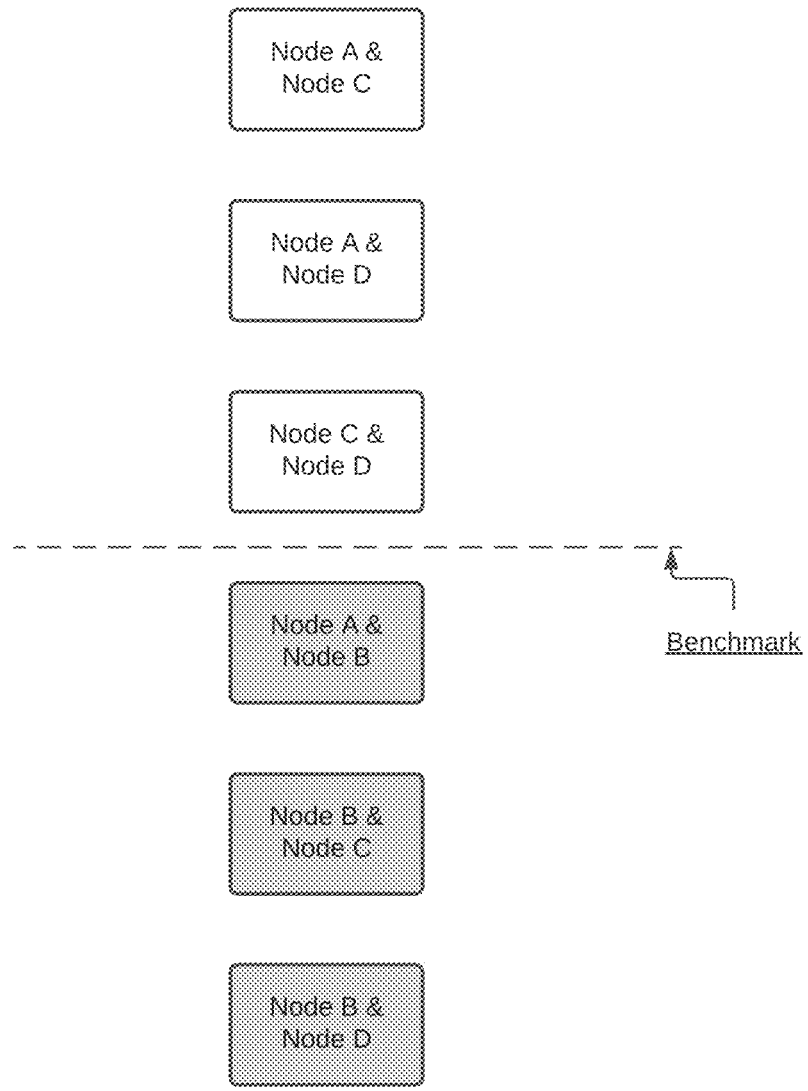
FIG. 7 illustrates an example of identifying likely unhealthy nodes or likely healthy nodes based on ranking node pairings and applying a benchmark in accordance with one or more embodiments of the present application.

In a second implementation, S240 may function to identify or detect non-performant computing nodes based on ranking or ordering each paired combination of idle computing nodes based on test metric data (e.g., descending performance metrics). In this second implementation, S240 may function to generate a plurality of distinct rankings with each distinct ranking being based on a different metric. In one example, in each testing cycle of an n−1 testing, S240 may function to source an average data, a maximum, or a percentile data throughput value for each paired combination of idle computing nodes. In this example, S240 may function to rank the plurality of paired combinations of idle computing nodes based on its associated average data throughput value. As shown by way of example in FIG. 7, in one or more embodiments, S240 applying a performance benchmark, such as a data throughput benchmark, against a ranking of a plurality of paired combinations of idle computing nodes may function to identify the paired combinations satisfying or exceeding the performance benchmark as including performant computing nodes and the paired combinations not satisfying the performance benchmark as likely including one or more non-performant computing nodes.

Additionally, or alternatively, in some embodiments, S240 may function to generate one or more graphical illustrations based on the node performance metrics and/or observations in which likely non-performant paired combinations of idle computing nodes are delineated differently than performant paired combinations of idle computing nodes. Based on the one or more graphical illustrations, likely non-performant paired combinations of idle computing nodes may be selected and/or routed for determining the likely faulty computing node in each non-performant paired combination.

In one or more embodiments, data visualization tools may be integrated within the assessment interface 110, providing administrators with intuitive dashboards that display the health of the cluster of computing nodes 140 and/or any individual computing node within the cluster. In such embodiments, some examples of the graphical illustrations or visualizations may include heat maps delineating between unhealthy and healthy computing nodes using color differentiation, time-series graphs, and computing node interconnectivity diagrams thereby allowing for a quick identification of problematic computing nodes.

2.50 Accumulation and Drop Out|Unhealthy Node Triage

S250, which includes handling non-performant or unhealthy computing nodes, may function to accumulate performant nodes within a quora of computing nodes while excluding or removing non-performant computing nodes based on an assessment of the node health assessment data, as described in at least S240.

In one or more embodiments, if S240 identifies a computing node as likely being a faulty or non-performant computing node, S250 may function to implement one or more protocols that minimize a degradative impact of the non-performant computing node. In such embodiments, S250 may function to quarantine the non-performant computing node from the remaining computing nodes of a target cluster of computing nodes 140. The quarantining, in one or more embodiments, may include flagging or marking the non-performant node for maintenance and further changing a state of the non-performant computing node to be offline from a previous online state. In an offline state, the non-performant computing node may not be accessible for user jobs but may remain accessible for testing, maintenance, and/or repair. Additionally, or alternatively, S250 may function to re-route traffic away from a likely unhealthy computing node that may enable a continued assessment of the likely unhealthy computing node in an online state.

Additionally, or optionally, S250 which includes S255, may function to route any non-performant computing node for additional downstream testing including, but not limited to, testing for characterizing a likely fault of a given non-performant node.

3. Method for Faulty Component Detection

As shown in FIG. 8, a method 300 for accelerating a detection of an unhealthy component of a likely unhealthy computing node of a computing cluster includes identifying a target computing node for component error testing S310, configuring a node component health assessment S320, executing a node component health assessment S330, identifying a state of health of one or more components of a target computing node S340, and remediating a faulty node component S350 including qualifying a computing node previously indicated as an unhealthy computing node S355.

3.1 Identification of Target Computing Node

S310, which includes identifying a target computing node for component error testing, may function to identify a computing node having a diagnosis of unhealthy or a confirmed state of health indicating that one or more operations of the computing may be anomalous and/or errant. In some embodiments, the diagnosis and/or state of health may include estimates of one or more likely causes or basis of the associated diagnosis. However, in such embodiments, the definitive cause(s) of the one or more issues associated with the computing node may not have been fully characterized and thus, the identification of the general unhealthy state of the computing may have been routed from one or more upstream processes that enables a classification of a computing node of unhealthy or healthy that may lack rationale for perceiving or otherwise, pinpointing a root cause of a classification of unhealthy.

In a first implementation, identifying a target computing node for component error testing may include identifying and/or selecting the target computing nodes from a work queue or the like having an enumerated listing of computing nodes with likely health defects. Accordingly, the work queue preferably relates to virtual data structure or the like that storing one or more entries of computing nodes together with an associated health state and which may be sometimes referred to herein as a "repair queue" or "maintenance queue". Additionally, or alternatively, the one or more entries of computing nodes in the work queue may be considered in a quarantined state, such that any of the computing nodes listed in the queue may be in an offline state and incapable of participating in a cluster of computing nodes that may actively process user jobs.

In this first implementation, the work queue may be in operable access communication with at least a health assessment module (i.e., a first module) that may operate to generate a course diagnosis or classification of healthy or unhealthy for each computing node that is assessed by the first module. Additionally, or alternatively, the work queue may be in operable access communication with at least a fault characterization module (i.e., a second module) that may operate to generate a granular diagnosis or classification that identifies one or more specific hardware components of a target computing node that has been classified as unhealthy by the health assessment module.

Additionally, or alternatively, the work queue may include health assessment observations or health assessment data stored in association with each respective computing node in the work queue. The health assessment data, in one or more embodiments, may include data observed during health testings performed in one or more upstream node health assessment modules or the like.

It shall be recognized that, while identifying a target computing node for component error testing preferably includes selecting or identifying the target computing node from a work queue or the like, a target computing node may be identified for component testing from any source including, but not limited to, ad hoc selection of a computing node based on circumstantial factors. As a non-limiting example, a target computing node may be identified based on computing exceptions arising from an attempt by the target computing node for processing a networking request and/or a processing request. In such an example, based on identifying the computing exceptions, the target computing node may be selected from node component error testing and routed to a work queue or the like.

3.2 Node Component Health Assessment: Configuration Phase

S320, which includes configuring a node component health assessment, may function to design one or more testing configurations for identifying one or more faulty nodes of a target computing node. In some embodiments, the one or more testing configurations may be informed by the node health assessment data associated with the target computing node. In such embodiments, the one or more performance measurements or test observations of the node health assessment data may pinpoint likely faulty components and thus, allowing testing prioritization of the likely faulty components.

In a preferred implementation, configuring the node component health assessment may include configuring a peer-to-peer assessment between the target computing node and one or more computing nodes of a peer group. In one or more embodiments, the peer group may be a quora of similar or like computing nodes or a broader cluster of computing nodes that includes one or more computing nodes having similar or same hardware attributes as the target computing node. In this first implementation, S320 may function to select from the peer group of computing nodes a peer computing node having a similar or same hardware components, which preferably includes the peer computing node having a similar or a same model type and/or a similar or a same number of a hardware component type that may be the subject of a node component health assessment test. In one example, if the target computing node includes eight (8) processing components (e.g., GPUs) of a particular type or model, S320 may preferably select a peer computing node from the peer group of computing nodes having 8 processing components that match the particular type or model of the target computing node. In this way, S320 may function to ensure hardware or attribute parity between the target computing node and the selected peer computing node.

In a preferred embodiment, S320 may function to select from the peer group a peer computing node that may be considered a golden model for comparisons and assessments of other computing nodes, as shown by illustration in FIG. 9. The peer computing node, in such preferred embodiment, may be considered a golden model as a result of being validated as a healthy or performant computing node based on one or more successfully satisfying one or more node health assessments.

Additionally, or alternatively, configuring the node component health assessment may include selecting one of a plurality of components of the target computing node for a node component health assessment. The target computing node may include a plurality of components, such as networking/interconnect components, processing components, and/or software components that may have an unhealthy state. In a preferred embodiment, S320 may function to select from among the plurality of components of the target computing node based on node health assessment data. In a non-limiting example, node health assessment data of the target computing data may indicate non-performant data transmission rates in one or more node health assessment tests. In such an example, based on the identification of non-performant data transmission rates, S320 may function to configure node component tests that prioritize testing networking or interconnect components of the target computing node for accelerating an identification of fault.

Accordingly, in such embodiments, a prioritized node component testing scheme may be configured in which S320 selects one or more node component health tests that will, in a prioritized manner (e.g., first set of tests, etc.), evaluate a health of a likely faulty node component based on the node health assessment data.

Additionally, or alternatively, based on selecting a peer computing node and a node component of the target computing node for a node component health assessment, S320 may function to set or establish a plurality of unique component testing pairs for testing the selected node component. In such embodiments, establishing the plurality of unique component testing pairs may include creating a pairwise between each instance of the selected node component of the target computing node and each instance of a same node component of the peer computing node. As an example, if the target component has processing components, "A" and "B", and the peer computing node includes processing components, "C" and "D", generating unique component testing pairs of all possible unique combinations of the process components for peer-to-peer testing would yield, "A & C", "A & D", "B & C", and "B & D".

It shall be recognized that when a plurality of distinct components (e.g., processing components, interconnect components, and the like) of a target computing node may be subject to node component health assessments, S320 may function to configure multiple node component health assessment in which a node component health assessment is configured or created for each unique component type of the target computing node. In one example, if a target computing node subject to node component testing includes processing components and networking components, S320 may function to configure or create a node component health assessment for the processing components and a second, distinct node component health assessment for the networking components of the target computing node. In this way, any number of distinct component types of a target computing node may have configured a distinct node component health assessment for each component type of the target computing node.

3.3 Node Component Health Assessment: Execution Phase

S330, which includes executing a node component health assessment, may function to execute a peer-to-peer health testing of one or more components of a target computing node for enabling an identification or a detection of one or more faulty or unhealthy components of the target computing node. Accordingly, based on the configuration of the node component health assessment in one or more embodiments, S330 may function to enable the node component health assessment by issuing one or more command instructions for executing bi-directional tests between each of the plurality of unique component testing pairs established between the components of the target computing node and components of a peer computing node that has been validated as a healthy node, i.e., a golden model.

Figure 11:
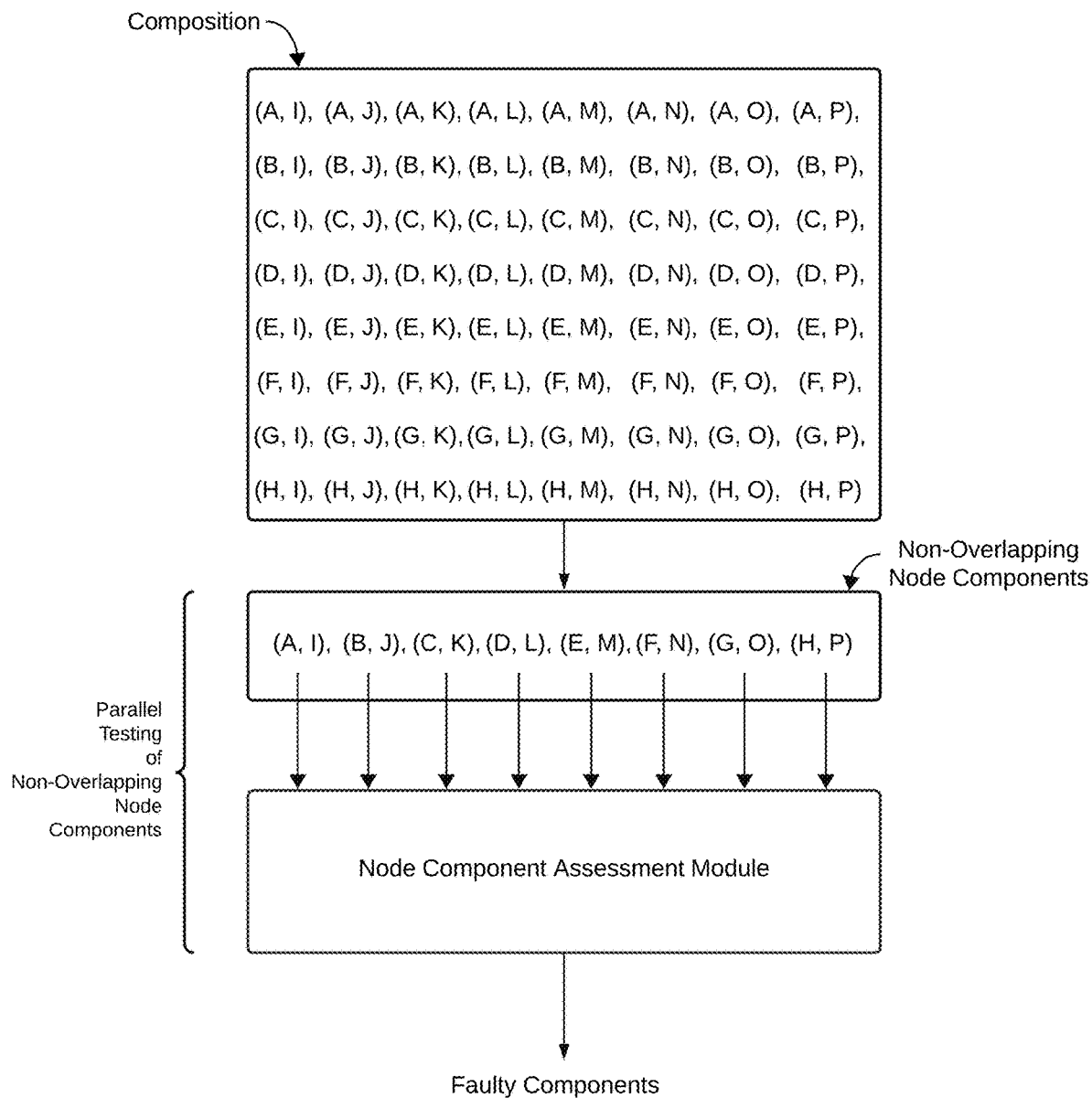
FIG. 11 illustrates a schematic of parallel testing of pairs of node components in accordance with one or more embodiments of the present application.

As shown by way of example in FIG. 11, in one or more embodiments, executing the node component health assessment includes concurrently executing bi-directional tests (e.g., parallel testing) between at least a subset of the plurality of unique component testing pairs. That is, in a preferred embodiment, S320 may function to identify a subset of component pairs of the plurality of unique component testing pairs in which node components of either the target computing node or the golden model do not overlap. As a non-limiting example, if a plurality of unique component testing pairs include unique component pairs of "A & C", "A & D", "B & C", and "B & D", S320 may function to select, for parallel testing, a subset of component pairs, such as sub-group_1: "A & C" and "B & D" or sub-group_2: "A & D" and "B & C". In either sub-group_1 or sub-group_2, the node components are not repeated in another unique component pair of the group; that is, the sub-group of unique node component pairs are non-overlapping. In this way, parallel testing of a plurality of unique node component pairings of a subset or sub-group may be executed without testing interference due to a single node component being a member of multiple node component pairs that are being tested in parallel (e.g., a node component being tested in parallel in two or more distinct node component pairings).

Additionally, or alternatively, executing the node component health assessment includes iteratively and/or sequentially executing bi-directional tests between each component pair of the plurality of unique component testing pairs. In one or more embodiments, a mapping of or a data structure (e.g., an index, etc.) that includes the plurality of unique component testing pairs may be used as a reference or as input to a node component testing module or the like executing the node component health assessment. In such embodiments, based on the input of the mapping of the plurality of unique component testing pairs, S320 may function to serially execute a node component health assessment on a pair-by-pair basis. That is, in one example, the serial execution of the node component health assessment tests one unique pair of node components of the plurality of unique component testing pairs and once completed, tests a subsequent unique pair of node components in the mapping of the plurality of unique component testing pairs.

3.4 Component Health Assessment Data|Faulty Component Detection

S340, which includes identifying a state of health of one or more components of a target computing node, may function to generate one or more fault characterizations of one or more components of the target computing node based on testing data and/or performance data derived from an execution of the node component health assessment (e.g., S330).

In one or more embodiments, S340 may function to obtain or derive one or more node component testing data metrics relating to an efficacy of each of the plurality of unique component testing pairs. In such embodiments, the testing data metrics may measure one or more direct operational attributes of a given component and/or derive indirect metric values that relate to and inform an operational efficacy of the given component. As a non-limiting example, the testing data metrics for a given processing component of a target computing node may measure compute performance (e.g., FLOPS), memory bandwidth and capacity, a number of shader units, fill rates, latency, and/or the like. As another non-limiting example, the testing data metrics for a given networking component of a target computing node may measure bandwidth (e.g., transfer rate), data transfer latency, error rate for data transmissions, quality of service capabilities, offload capabilities, and/or the like.

Figure 10:
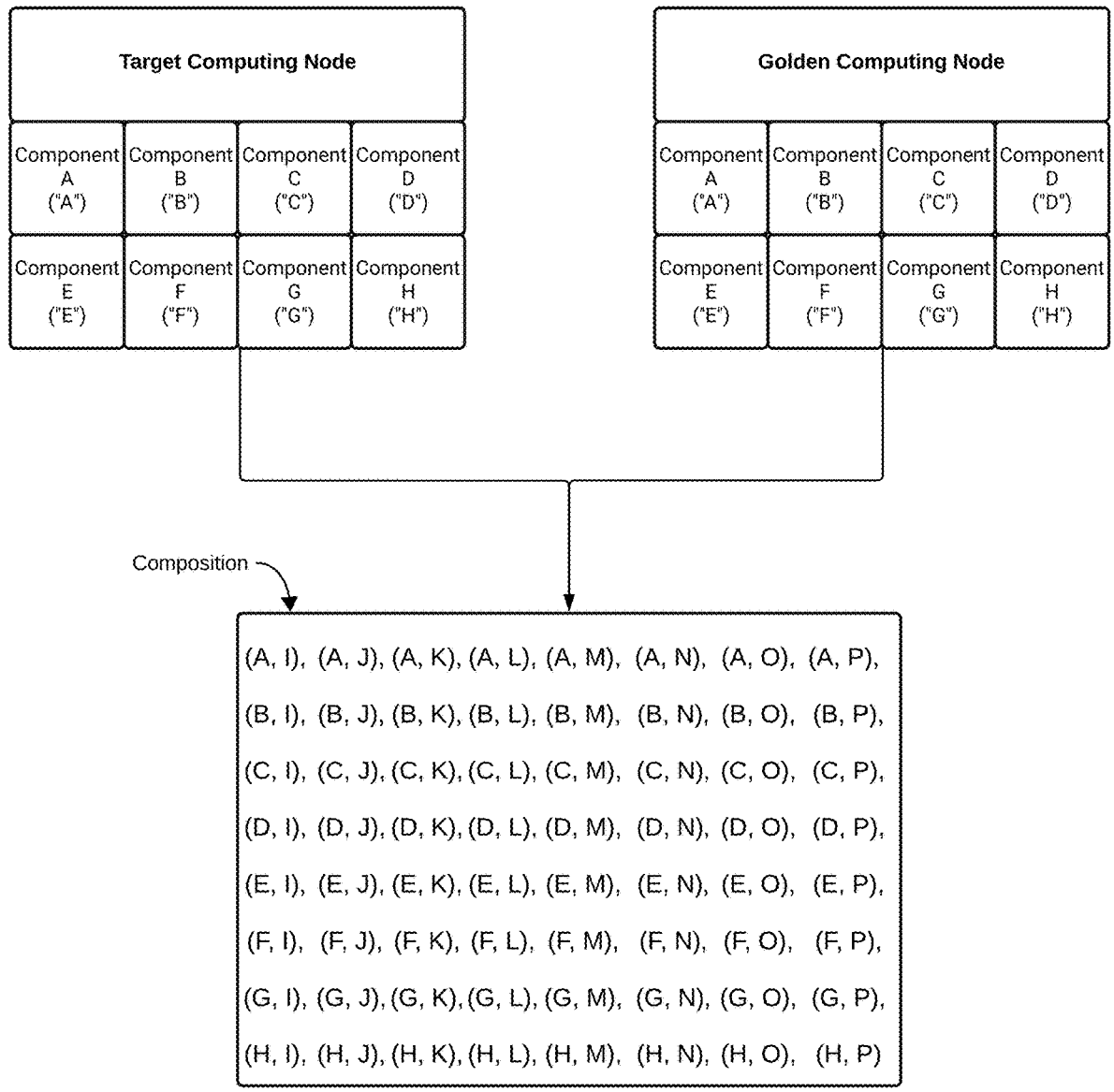
FIG. 10 illustrates a schematic of an example generation of a node component composition in accordance with one or more embodiments of the present application.
Figure 12:
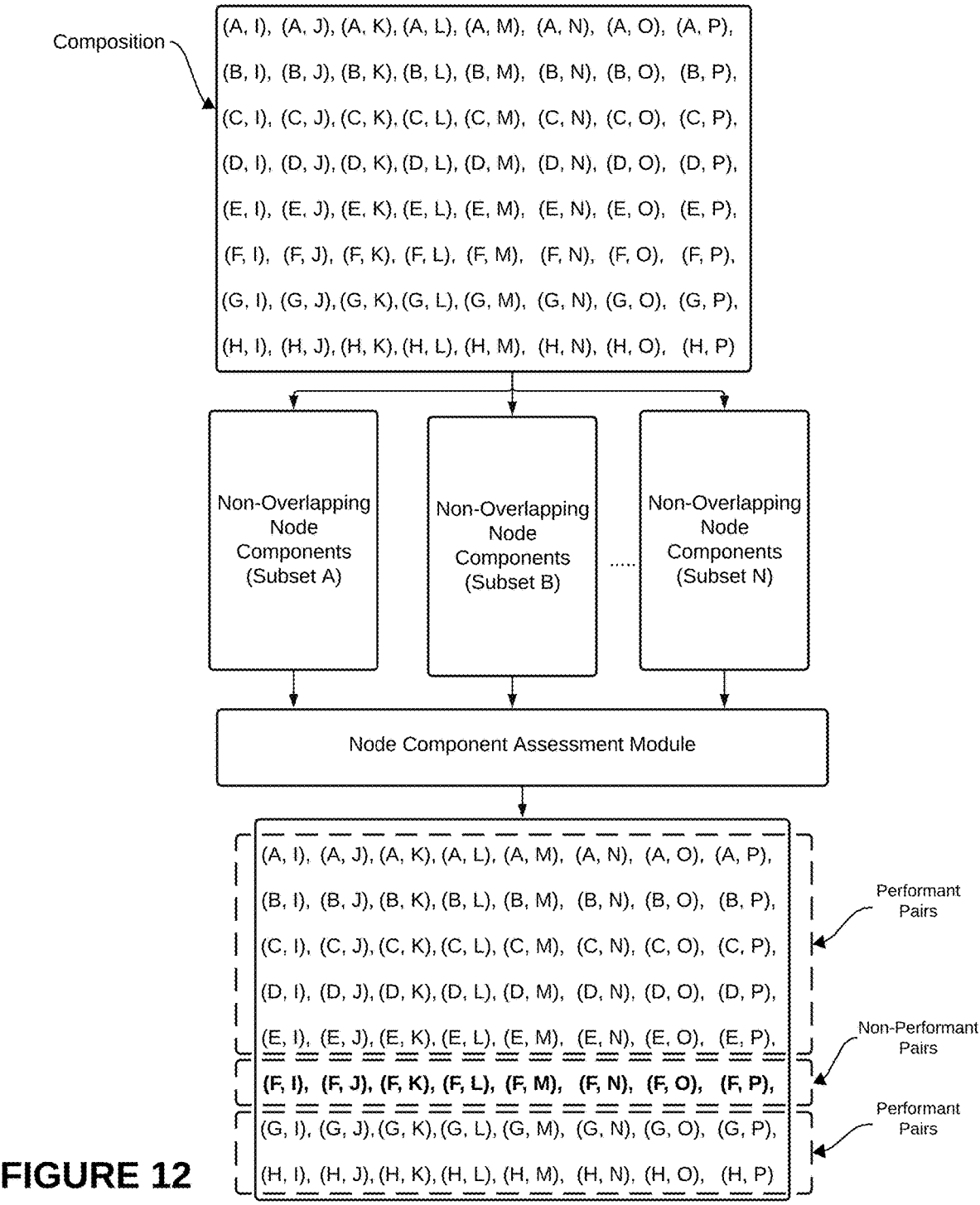
FIG. 12 illustrates a schematic of an assessment of a node component composition for faulty node components in accordance with one or more embodiments of the present application.

In one or more embodiments, identifying the state of health of the one or more components of the target computing node includes generating an assessment composition of peer-to-peer evaluations of node component pairs, as shown by way of example in FIG. 10. In such embodiments, assessment composition may be illustrated or may be graphically represented, via a user interface (e.g., a graphical user interface, computer window, or the like) as a mapping or listing of the plurality of unique component testing pairs with an identification of the node component testing pairs that fail to satisfy one or more healthy efficacy benchmarks (e.g., one or more minimum performance values) or that demonstrate anomalous behaviors, as shown by way of example in FIG. 12.

Additionally, or alternatively, identifying a state of health of one or more components of a target computing node includes deducing one or more likely faulty node components based on the testing data and/or performance data. In one or more embodiments, if the performance data includes an assessment composition or similar derived artifact, S340 may function to evaluate and deduce from the assessment composition one or more node components having an unhealthy state or that may be faulty. In such embodiments, S340 may function to identify non-performant component pairs within the assessment composition and identify any node component that may be common to a plurality (e.g., two or more) of the non-performant component pairs. In such embodiments, S340 may function to generate one or more inferences identifying the one or more node components that are commonly found in non-performant component pairs as either faulty or unhealthy.

Additionally, or alternatively, S340 may function to generate a fault characterization of each of the one or more node components identified as faulty or unhealthy. In one or more embodiments, S340 may function to generate the fault characterization based on testing data metrics and/or performance data associated with each respective faulty or unhealthy node. In such embodiments, S340 may infer a fault rationale or description of fault based on a subset of the test data metric values or performance data values associated with a faulty node component that fail to satisfy healthy component benchmarks. As a non-limiting example, if a measured clock speed of a processing component fails to satisfy a healthy clock speed benchmark and a power consumption of the processing component exceeds a healthy power consumption benchmark, S340 may infer or generate a fault description indicating that it is likely that an overheating of the processing component due to high power consumption may be causing the processing component to reduce or throttle its clock speed.

3.5 Faulty Node Component Remediation

S350, which includes remediating a faulty node component, may function to remediate one or more faults associated with components of a target computing node based on the identification of a faulty node component and/or a fault characterization of the faulty node component.

In one or more embodiments, remediating the faulty node component includes determining one or more remediation actions for repairing a target computing node having a faulty node component based on a fault characterization associated with the faulty node component. That is, in such embodiments, the fault characterization may be used as selection criteria for selecting one or more remediation actions that may be executed for repairing the fault identified in the fault characterization. In one or more embodiments, S350 may function to implement a repair matrix or similar data structure (or database) that maps known or identified node component faults to one or more likely repairs for remediating the identified node component faults. In such embodiments, S350 may execute a search of the repair matrix using the fault characterization to form a search query for retrieving from the repair matrix a likely repair action (e.g., a remediation action) for repairing the fault associated with the target computing node.

Additionally, or alternatively, S350 may function to route the target computing node to a repair queue, which may enumerate the one or more faults associated with one or more components of the target computing node.

3.55 Reintegration of Cleared Computing Nodes

Additionally, or alternatively, a handling of a computing node having an identified unhealthy component may include a reintegration of the computing node within the target cluster of computing nodes based on one or more repair and/or maintenance actions that ameliorate one or more unhealthy attributes of the computing node. In one or more embodiments, the reintegration may include executing a qualification protocol that includes one or more steps for evaluating a state of health of a computing node prior to enabling the computing node to come online in a cluster of computing nodes.

In one or more embodiments, S350 which includes S355 may function to qualify a computing node previously indicated as an unhealthy computing node. In such embodiments, S355 may function to execute a qualification protocol or process that includes a plurality of node tests that confirm or ensure that any maintenance and/or unhealthy diagnosis of a target computing node have been addressed. In some embodiments, the qualification protocol may include a predetermined set of node tests that may be serially executed for testing a state of health of various hardware components and/or software (e.g., firmware, etc.). In one or more embodiments, the qualification protocol may include a set of node health tests that may be dynamically composed based on historically identified defects and/or previously mitigated unhealthy attributes of the target computing node. In one example, if a processing component of a target computing node is indicated as having a previously unhealthy component, S355 may function to dynamically compose the node test pool to include one or more tests that may assess a state of health of the processing component of the target computing node.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for enhanced fault detection of a component of a computing node, the method comprising:
   executing a component health assessment of a plurality of components of a target computing node based on identifying the target computing node as having an unhealthy state of health, wherein executing the component health assessment of the plurality of components includes:
      identifying a healthy computing node having a healthy state of health;
      establishing a plurality of distinct pairs of components, each distinct pair of components of the plurality of distinct pairs of components includes one component of the target computing node and one component of the healthy computing node; and
      executing bi-directional testing by each of the plurality of distinct pairs of components;
   evaluating health assessment data generated based on the execution of the bi-directional testing, wherein evaluating the health assessment data includes:
      identifying a subset of pairs of components of the plurality of distinct pairs of components that fail to satisfy one or more performance benchmarks; and
      identifying within the subset of pairs of components, the one or more components of the target computing node appearing in more than one pair of components of the subset of pairs of components; and
   classifying as faulty one or more components of the plurality of components of the target computing node based on the evaluation of the health assessment data, wherein the classification of faulty is based at least on the one or more components of the target computing node appearing in the more than one pair of components of the subset of pairs of components.

2. The method according to claim 1, wherein evaluating the health assessment data includes:
   comparing a performance metric of each pair of components of the plurality of distinct pairs of components to a performance benchmark; and
   identifying any component of the target computing node that fails to satisfy the performance benchmark across multiple pairs of components of the plurality of distinct pairs of components.

3. The method according to claim 2, wherein the classification of faulty is based at least on identifying the one or more components of the target computing node in the multiple pairs of components of the plurality of distinct pairs of components.

4. The method according to claim 1, wherein establishing the plurality of distinct pairs of components includes computing a Cartesian product between a set of components of the target computing node and a set of components of the healthy computing node.

5. The method according to claim 1, wherein the plurality of components of the target computing node includes a plurality of distinct component types including a plurality of processing components and a plurality of networking components.

6. The method according to claim 1, further comprising:
   configuring the component health assessment based on identifying a suspected faulty component type of the plurality of distinct component types of the target computing node, wherein configuring the health assessment includes selecting one or more node component health tests according to a component type of the suspected faulty component type.

7. The method according to claim 1, wherein executing the bi-directional testing includes:
   concurrently executing the bi-directional testing by at least a subset of pairs of components of the plurality of distinct pairs of components, each pair of the subset of pairs including a unique combination of components that does share a component that is common with any other pair of the subset of pairs.

8. The method according to claim 1, further comprising:
   identifying from a repair matrix one or more remedial actions for repairing the target computing node based on the classification of faulty of the one or more components, wherein:
      the repair matrix comprises a data structure that maps each of a plurality of distinct faults to one or more remedial actions, and
      identifying the one or more remedial actions includes performing a search of the repair matrix using data associated with the classification of faulty.

9. The method according to claim 1, further comprising:
   generating an assessment composition based on the health assessment data, wherein the assessment composition comprises a graphical illustration listing the plurality of distinct pairs of components with an identification within the listing of the one or more components of the plurality of components that fail to satisfy one or more tests of the node component health assessment.

10. The method according to claim 1, wherein:
    the healthy computing node is selected from a peer group of computing nodes associated with the target computing node; and
    the peer group of computing nodes includes a plurality of computing nodes having common hardware attributes as the target computing node.

11. A system for enhanced fault detection of a component of a computing node, the system comprising: a computing node configured to execute a component health assessment of a plurality of components of a target computing node based on identifying the target computing node as having an unhealthy state of health, wherein executing the component health assessment of the plurality of components includes:
  identifying a healthy computing node having a healthy state of health;
  establishing a plurality of distinct pairs of components, each distinct pair of components of the plurality of distinct pairs of components includes one component of the target computing node and one component of the healthy computing node; and
  executing bi-directional testing by each of the plurality of distinct pairs of components;
  wherein the health assessment executed by the computing node further comprises: evaluating health assessment data generated based on the execution of the bi-directional testing, wherein evaluating the health assessment data includes:
  identifying a subset of pairs of components of the plurality of distinct pairs of components that fail to satisfy one or more performance benchmarks; and identifying within the subset of pairs of components, the one or more components of the target computing node appearing in more than one pair of components of the subset of pairs of components; and
  and fault characterization, which classifies one or more components of the plurality of components of the target computing node based on the evaluation of the health assessment data, wherein the classification of faulty is based at least on the one or more components of the target computing node appearing in the more than one pair of components of the subset of pairs of components.

12. The system according to claim 11, wherein evaluating the health assessment data includes:
  comparing a performance metric of each pair of components of the plurality of distinct pairs of components to a performance benchmark; and
  identifying any component of the target computing node that fails to satisfy the performance benchmark across multiple pairs of components of the plurality of distinct pairs of components.

13. The system according to claim 11, wherein executing the bi-directional testing includes:
  concurrently executing the bi-directional testing by at least a subset of pairs of components of the plurality of distinct pairs of components, each pair of the subset of pairs including a unique combination of components that does share a component that is common with any other pair of the subset of pairs.

14. A computer-program product comprising a non-transitory machine-readable storage medium storing computer instructions that, when executed by one or more processors, perform operations comprising:
  executing a component health assessment of a plurality of components of a target computing node based on identifying the target computing node as having an unhealthy state of health, wherein executing the component health assessment of the plurality of components includes:
  identifying a healthy computing node having a healthy state of health;
  establishing a plurality of distinct pairs of components, each distinct pair of components of the plurality of distinct pairs of components includes one component of the target computing node and one component of the healthy computing node; and
  executing bi-directional testing by each of the plurality of distinct pairs of components;
  evaluating health assessment data generated based on the execution of the bi-directional testing, wherein evaluating the health assessment data includes:
  identifying a subset of pairs of components of the plurality of distinct pairs of components that fail to satisfy one or more performance benchmarks; and
  identifying within the subset of pairs of components, the one or more components of the target computing node appearing in more than one pair of components of the subset of pairs of components; and
  classifying as faulty one or more components of the plurality of components of the target computing node based on the evaluation of the health assessment data, wherein the classification of faulty is based at least on the one or more components of the target computing node appearing in the more than one pair of components of the subset of pairs of components.

15. The computer-program product according to claim 14, wherein evaluating the health assessment data includes:
  comparing a performance metric of each pair of components of the plurality of distinct pairs of components to a performance benchmark; and
  identifying any component of the target computing node that fails to satisfy the performance benchmark across multiple pairs of components of the plurality of distinct pairs of components.

16. The computer-program product according to claim 14, wherein executing the bi-directional testing includes:
  concurrently executing the bi-directional testing by at least a subset of pairs of components of the plurality of distinct pairs of components, each pair of the subset of pairs including a unique combination of components that does share a component that is common with any other pair of the subset of pairs.

17. A method for enhanced fault detection of a component of a computing node, the method comprising:
  executing a component health assessment of a plurality of components of a target computing node based on identifying the target computing node as having an unhealthy state of health, wherein executing the component health assessment of the plurality of components includes:
  identifying a healthy computing node having a healthy state of health;
  establishing a plurality of distinct pairs of components, each distinct pair of components of the plurality of distinct pairs of components includes one component of the target computing node and one component of the healthy computing node, wherein establishing the plurality of distinct pairs of components includes computing a Cartesian product between a set of components of the target computing node and a set of components of the healthy computing node; and
  executing bi-directional testing by each of the plurality of distinct pairs of components;
  evaluating health assessment data generated based on the execution of the bi-directional testing; and
  classifying as faulty one or more components of the plurality of components of the target computing node based on the evaluation of the health assessment data.

18. The method according to claim 17, wherein evaluating the health assessment data includes:
  identifying a subset of pairs of components of the plurality of distinct pairs of components that fail to satisfy one or more performance benchmarks; and identifying within the subset of pairs of components, the one or more components of the target computing node appearing in more than one pair of components of the subset of pairs of components.

19. The method according to claim 18, wherein the classification of faulty is based at least on the one or more components of the target computing node appearing in the more than one pair of components of the subset of pairs of components.

* * * * *